United States Patent
Newton et al.

(10) Patent No.: US 9,560,174 B2
(45) Date of Patent: Jan. 31, 2017

(54) NETWORK ROUTING OVERLAY

(71) Applicant: Southwest Research Institute, San Antonio, TX (US)

(72) Inventors: Todd A. Newton, San Antonio, TX (US); Ben A. Abbott, San Antonio, TX (US); Myron L. Moodie, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 225 days.

(21) Appl. No.: 14/308,353

(22) Filed: Jun. 18, 2014

(65) Prior Publication Data
US 2015/0372924 A1 Dec. 24, 2015

(51) Int. Cl.
H04L 29/06 (2006.01)
H04L 12/717 (2013.01)
H04L 12/851 (2013.01)

(52) U.S. Cl.
CPC .............. H04L 69/22 (2013.01); H04L 45/42 (2013.01); H04L 47/2408 (2013.01)

(58) Field of Classification Search
None
See application file for complete search history.

(56) References Cited

U.S. PATENT DOCUMENTS

| 8,467,295 B2 | 6/2013 | Kaempfer et al. | |
| 2005/0037770 A1* | 2/2005 | Takeda | H04W 48/10 455/453 |
| 2008/0130490 A1* | 6/2008 | Yu | H04L 12/4633 370/223 |

(Continued)

OTHER PUBLICATIONS

Bianco, A., et al., "Control and Management Plane in a Multi-stage Software Router Architecture", International Conference on High Performance Switching and Routing, 2008 (HSPR 2008), May 15-17, 2008, pp. 235-240, IEEE, Piscataway, NJ.

(Continued)

Primary Examiner — Huy D Vu
Assistant Examiner — Bao G Nguyen
(74) Attorney, Agent, or Firm — Grossman, Tucker et al

(57) ABSTRACT

The present disclosure relates to a network routing overlay (NRO) system. The NRO system includes an NRO master that includes an NRO master module and a master network interface. The NRO system further includes a first plurality of NRO remote systems (RSs). Each NRO RS includes an NRO RS module, an internal network interface and an external network interface. The external network interface is related to an NRO interface. Each NRO RS is coupled to the NRO master by a respective data channel and a respective control channel. A first NRO RS is configured to receive a network frame from an end system coupled to the first NRO RS via a first NRO interface. A first NRO RS module is configured to generate an NRO message and to write the NRO message to a first data channel. The NRO message includes an NRO prefix and the received network frame. The NRO prefix includes a length and a frame identifier (ID). The first data channel is configured to carry an NRO frame that includes one or more NRO message(s). The NRO master module is configured to extract the network frame based, at least in part, on the length and frame ID.

24 Claims, 12 Drawing Sheets

(56) References Cited

U.S. PATENT DOCUMENTS

| | | | | |
|---|---|---|---|---|
| 2008/0285564 A1* | 11/2008 | Park | ........................ | H04L 69/26 370/392 |
| 2010/0103860 A1* | 4/2010 | Kim | ................... | H04B 7/15557 370/315 |
| 2010/0202343 A1* | 8/2010 | Hunzinger | ............. | H04B 7/155 370/315 |
| 2010/0214973 A1* | 8/2010 | Lim | ..................... | H04W 76/02 370/315 |
| 2014/0112349 A1 | 4/2014 | Moreno et al. | | |

OTHER PUBLICATIONS

Bianco, A., et al., "Multistage Switching Architectures for Software Routers", IEEE Network, Jul. 23, 2007, pp. 15-21, vol. 21, Issue 4, IEEE, Piscataway, NJ.

Bianco, A., et al., "SNMP Management in a Distributed Software Router Architecture", 2011 IEEE International Conference on Communications (ICC), Jun. 5-9, 2011, pp. 1-5, IEEE, Piscataway, NJ.

Bolla, R., et al., "A Cooperative Middleware for Distributed SW Routers", 2010 International Symposium on Performance Evaluation of Computer and Telecommunication Systems (SPECTS), Jul. 11-14, 2010, pp. 250-257, IEEE (Institute of Electrical and Electronics Engineers), Piscataway, NJ, Conference Location: Ottawa, ON.

Bolla, R., et al, "An Open-source Platform for Distributed Linux Software Routers", Computer Communications, Feb. 15, 2013 (available online: Nov. 21, 2012), pp. 396-410, vol. 36, Issue 4, Elsevier, New York, NY.

Bolla, R. et al., "DROP: An Open-Source Project Towards Distributed SW Router Architectures", Global Telecommunications Conference, 2009 (GLOBECOM 2009), Nov. 30, 2009-Dec. 4, 2009, pp. 1-6, IEEE, Piscataway, NJ, Conference Location: Honolulu, HI.

Khan, A.J., et al., "Distributed PC Based Routers: Bottleneck Analysis and Architecture Proposal", International Conference on High Performance Switching and Routing, 2008 (HSPR 2008), May 15-17, 2008, pp. 57-62, IEEE, Piscataway, NJ, Conference Location: Shanghai.

Snoeren, A.C., et al., "Fine-Grained Failover Using Connection Migration", Proceedings of the 3rd USENIX Symposium on Internet Technologies and Systems, Mar. 26-28, 2001, pp. 221-232, USENIX Association, Berkeley, CA., Conference Location: San Francisco, CA.

\* cited by examiner

NETWORK ROUTING OVERLAY

FIELD OF THE INVENTION

This disclosure relates to a system and method configured for providing a network routing overlay between a plurality of end systems.

BACKGROUND

A network typically includes a plurality of interconnected computing devices. Network traffic transmitted between computing devices may travel across the network via a path that includes a number of interconnected network devices.

SUMMARY

The present disclosure relates in one embodiment to a system. The system includes a network routing overlay (NRO) system. The NRO system includes an NRO master that includes an NRO master module and a master network interface. The NRO system further includes a first plurality of NRO remote systems (RSs). Each NRO RS includes an NRO RS module, an internal network interface and an external network interface. The external network interface is related to an NRO interface. Each NRO RS is coupled to the NRO master by a respective data channel and a respective control channel. A first NRO RS is configured to receive a network frame from an end system coupled to the first NRO RS via a first NRO interface. A first NRO RS module is configured to generate an NRO message and to write the NRO message to a first data channel. The NRO message includes an NRO prefix and the received network frame. The NRO prefix includes a length and a frame identifier (ID). The first data channel is configured to carry an NRO frame that includes one or more NRO message(s). The NRO master module is configured to extract the network frame based, at least in part, on the length and frame ID.

The present disclosure relates in another embodiment to a method. The method includes establishing, by a network routing overlay (NRO) master module, a respective data channel and a respective control channel between an NRO master and each NRO remote system (RS) of a first plurality of NRO RSs. The NRO master and first plurality of NRO RSs are included in an NRO system. The method further includes receiving, by a first NRO RS, a network frame from an end system coupled to the first NRO RS via a first NRO interface. The method further includes generating, by a first NRO RS module, an NRO message including an NRO prefix and the received network frame. The NRO prefix includes a length and a frame identifier (ID). The method further includes writing, by the first NRO RS module, the NRO message to a first data channel configured to carry an NRO frame including one or more NRO message(s). The method further includes extracting, by the NRO master module, the network frame based, at least in part, on the length and frame ID.

The present disclosure relates in one embodiment to a system. The system includes one or more machine readable storage devices having stored thereon, individually or in combination, instructions that when executed by one or more processors result in the following operations. The operations include establishing a respective data channel and a respective control channel between an NRO master and each NRO remote system (RS) of a first plurality of NRO RSs. The NRO master and first plurality of NRO RSs are included in an NRO system. The operations further include receiving a network frame from an end system coupled to the first NRO RS via a first NRO interface. The operations further include generating an NRO message including an NRO prefix and the received network frame. The NRO prefix includes a length and a frame identifier (ID). The operations further include writing the NRO message to a first data channel configured to carry an NRO frame including one or more NRO message(s) and extracting the network frame based, at least in part, on the length and frame ID.

BRIEF DESCRIPTION OF THE DRAWINGS

The detailed description below may be better understood with reference to the accompanying figures which are provided for illustrative purposes and are not to be considered as limiting any aspect of the invention.

DETAILED DESCRIPTION

Figure 1:
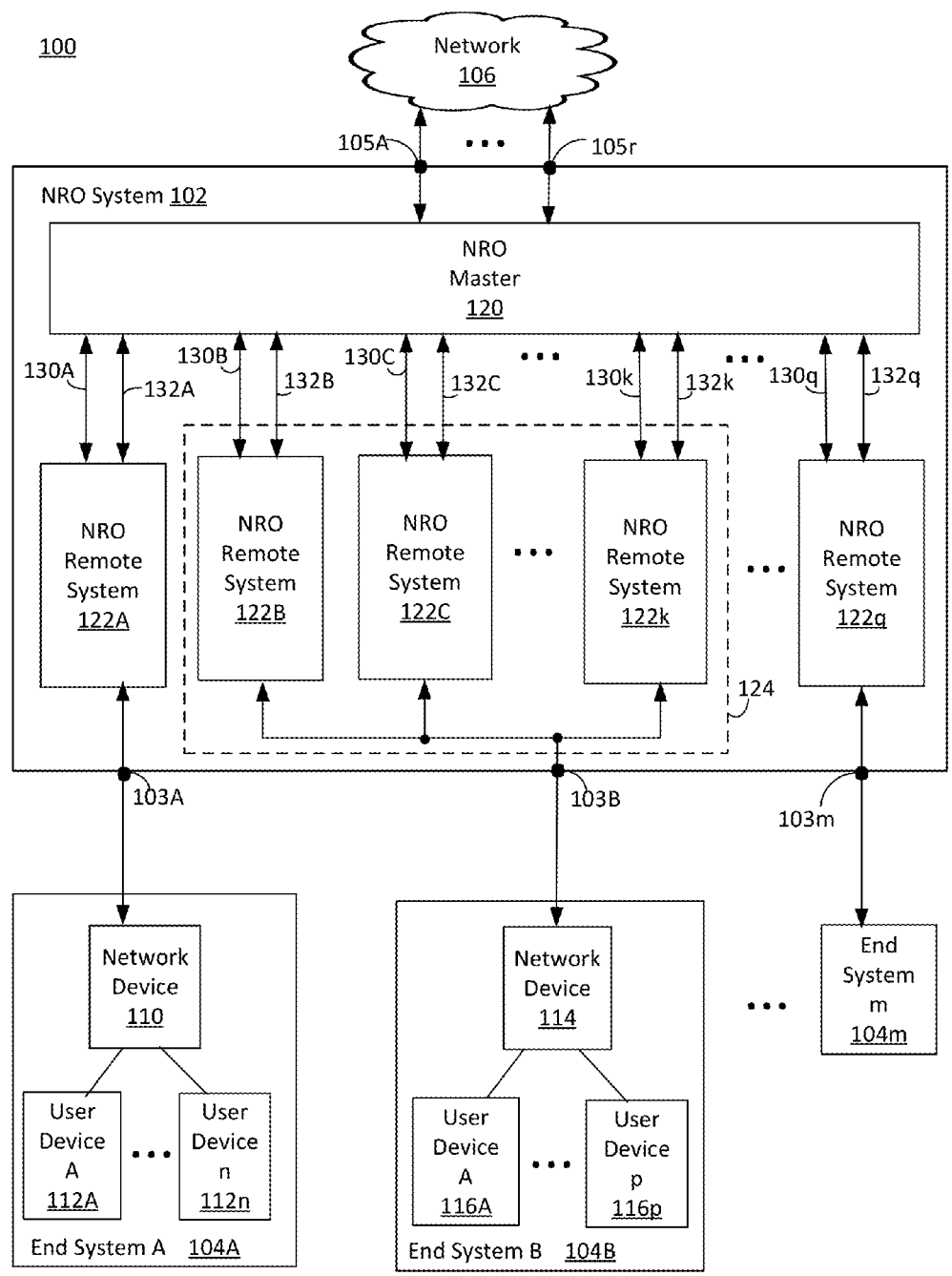
FIG. 1 depicts an exemplary system block diagram of a network system including a network routing overlay (NRO) system consistent with various embodiments of the present disclosure.

In general, the present disclosure describes a system and method configured to provide a network routing overlay (NRO) coupled between a plurality of end systems. The NRO is configured to overlay an underlying network that provides actual physical connectivity between the plurality of end systems and is configured to appear to end system(s) as a single network device, e.g., a single network hop. Thus, each end system may appear to be one network hop from each other end system.

The underlying network may include one or more interconnected networks, i.e., may be an internetwork. Each of the plurality of end systems may be coupled to the NRO system at a respective NRO interface and may be configured to transmit and/or receive network frames to/from a respective NRO interface. The NRO system may then be configured to implement one or more network traffic management functions and/or policies related to communicating network traffic between end systems. The management functions and/or policies may include, for example, centralized forwarding decisions based, at least in part, on conditions (e.g., congestion) at each detected NRO interface.

In conventional network systems, the underlying network may not be managed and/or controlled by entities ("private entities") that manage and/or control the end systems that are coupled by the underlying network. Adjusting network parameters to "tune" the underlying network and/or manage different and possibly competing priorities for network traffic transmitted from/to the end system(s) may thus not be possible for the private entities. An NRO consistent with the present disclosure is configured to provide the private entities with the ability to tune transmission of network traffic between the end systems to provide end system to end system management.

The NRO includes an NRO master and a plurality of NRO remote systems (RSs) configured to couple the NRO master to the NRO interfaces and thereby to the plurality of end systems. The NRO master is configured to provide centralized management and control, to monitor congestion at the NRO interfaces and associated NRO RSs and to implement congestion management functions via the NRO RSs.

The NRO master is configured to couple to each NRO RS by a data channel and a control channel. The data channels and control channels are configured for internal communication between the NRO master and the NRO RSs. The NRO master is configured to manage operations of the NRO RSs via commands transmitted to the NRO RSs via respective control channels. The data channels are configured to carry NRO frames that include one or more NRO message(s) as payload between the NRO master and respective NRO RSs, as described herein.

Each NRO RS includes an internal network interface and an external network interface. The NRO master includes a master network interface. Each NRO RS is configured to couple to the NRO master network interface via the NRO RS's respective internal network interface and to a respective end system via the NRO RS's respective external network interface. Each interface may be identified by at least one respective network interface identifier. Network interface identifiers may include link layer identifiers (e.g., MAC addresses) and/or network layer identifiers (e.g., IP addresses). Thus, an NRO interface may be identified by a link layer identifier and a network layer identifier that correspond to an external network interface. An end system connected to the NRO interface may then be configured with the external network interface identifiers as destination addresses for communication of network frames from the end system to the NRO RS. The NRO master is configured to establish a tap interface for each NRO interface. Each tap interface may then be configured with respective network interface identifier(s) that correspond to the respective NRO interface. For example, each tap interface may be configured with the MAC address and IP address of a respective NRO RS external network interface.

In operation, each NRO RS is configured to transmit and receive network frames to/from a respective end system and to transmit and receive NRO frames to/from the NRO master. Each NRO frame is configured to contain one or more NRO messages as payload. Each NRO message includes a respective network frame prepended with an associated NRO prefix that includes a network frame length and network frame identifier. An NRO master module, for example, is configured to utilize each NRO prefix to extract an associated network frame. Each received network frame may then be provided to a master operating system (OS) through the protocol stack from the selected tap interface. The master OS is configured to perform routing operations for the NRO master. After routing, network frames destined for an end system coupled to an NRO interface may be sent to the tap interface by the master OS, received by the NRO master module and a new NRO message may be generated by the NRO master module. NRO interfaces may thus appear to the master OS and associated routing module as local interfaces on the NRO master. The NRO system may then appear as a single network device coupling end systems. Thus, a destination end system may appear to be one network hop from a source end system.

The NRO master module may be configured to implement one or more network traffic management functions by one or more of sending commands to NRO RSs, selectively providing extracted network frames to the OS and/or selectively providing NRO messages generated for network frames received from the OS to a data channel for transmission to a destination NRO RS. For example, commands to NRO RSs may configure selected NRO RSs to throttle, i.e., limit, transmission of NRO messages. In another example, commands may configure NRO RSs to adjust Differentiated Services Code Point (DSCP) packet markings for selected packet flows. In another example, the NRO may facilitate achieving a desired Quality of Service for network traffic (i.e., network frames) travelling from a first end system to a second end system. For example, each NRO RS may be configured to notify the NRO master if congestion exists or is imminent. The NRO master may then implement one or more network traffic management functions, including, e.g., adjusting forwarding decisions, based, at least in part, on the congestion notification(s).

As used herein, an end system may include a user device and/or a plurality of user devices coupled in a private network. In some embodiments, the private network may be mobile, e.g., may be included in a vehicle. As used herein, user device includes a computing device including, but not limited to, a server, a workstation computer, a desktop computer, a laptop computer, a tablet computer (e.g., iPad®, GalaxyTab® and the like), an ultraportable computer, an ultramobile computer, a netbook computer and/or a subnotebook computer; a mobile telephone including, but not limited to a smart phone, (e.g., iPhone®, Android®-based phone, Blackberry®, Symbian®-based phone, Palm®-based phone, etc.) and/or a feature phone; and/or other user devices including, but not limited to, a camera, a personal digital assistant, an enterprise digital assistant, a mobile internet device, a personal navigation device, sensor systems configured to capture and transmit images, sound, environmental data (e.g., temperature, humidity, motion, etc.). A private network may include a plurality of user devices coupled to one or more network device(s) with at least one network device configured to couple the private network to another network (e.g., internetwork such as the Internet and/or another private network). In an embodiment consistent with the present disclosure, at least one network device(s) is configured to couple the private network to the NRO system.

One or more of the interconnected network(s) of the underlying network may be configured as a packet-switched network. In packet-switched networks, data is divided into units, combined with control and/or routing information and sent over the network. Operations associated with routing and/or control are typically divided into layers that may include one or more protocols. The layers and associated protocols may be grouped into a protocol stack. Typically, a highest layer is related to operations performed by an application program and a lowest layer is related to a physical transmission medium. Data to be transmitted is typically understood to traverse the protocol stack from the highest layer to the lowest layer for transmission and from the lowest layer to the highest layer for reception. A communication unit at each layer, generically called a "packet" herein, includes a header and a payload. The header includes control information and addressing information related to the layer (and protocol) and the payload includes data and typically includes control and addressing information from a higher layer. Data may include, e.g., voice, file data, messages, etc. For transmission, protocol operations at each layer typically encapsulate the packet from a next higher layer into a payload associated with the current layer by adding a header, thus, a payload may include header information from higher layers as well as the data to be transmitted.

Generally, the layer structure may be based on the International Organization for Standardization/Open Systems Interconnection (ISO/OSI) reference model (defined in ITU-T Recommendation X.200) that includes seven layers: application (layer 7), presentation (layer 6), session (layer 5), transport (layer 4), network (layer 3), data link (layer 2) and physical layer (layer 1). With respect to the Internet, a five-layer reference model has been defined to include application (layer 5), transport (layer 4), Internet (layer 3), network interface (layer 2) and physical layer (layer 1). Layer 2 is also known as the medium access control (MAC) layer. Thus, layer 1 corresponds to a physical layer and relates to the physical transmission medium (e.g., coaxial cable, etc.) and characteristics of signals carried by the medium. Layer 2 corresponds to a network interface layer and the communication unit is a frame (i.e., a lowest level communication unit) that includes a frame header and a frame payload. Each frame header includes control and/or addressing information (e.g., source and destination network interface addresses for the frame) and the frame payload includes frame data. For example, the network interface address(es) may correspond to MAC address(es). Layer 3 corresponds to the Internet layer and the communication unit is an Internet Protocol (IP) datagram. An IP datagram may be included in a frame payload. An IP datagram includes an IP header and an IP payload. The IP header includes source and destination addresses (32-bit for IPv4, 128-bit for IPv6) known as IP addresses. Each IP address may be divided into an IP prefix that specifies a network and an IP suffix that specifies a computing device in that network. For example, network and/or user devices that are connected (i.e., are local) may be identified by layer 2 (e.g., MAC) addresses and network and/or user devices coupled by one or more intermediate devices and/or networks may be identified by layer 3 (e.g., IP) addresses.

A given layer may include one or more protocols. Protocols are configured to specify all aspects of communication including, but not limited to, formats of packets, how received packets are processed, response to errors in a received packet, etc. Example protocols include, but are not limited to, Ethernet, X.25, TCP/IP (Transmission Control Protocol/Internet Protocol), UDP (User Datagram Protocol), SSL (Secure Socket Layer), TLS (Transport Layer Security), etc. The Ethernet protocol is related to layer 1 (the physical layer) and layer 2 (the data link layer in the OSI model and the network interface layer for the Internet model). The Ethernet protocol may comply or be compatible with IEEE Standard for Ethernet (IEEE Std 802.3™) protocol. Wireless communication may comply or be compatible with IEEE 802.11 wireless (IEEE Std 802.11™) protocol. Both IEEE Std 802.3™ and IEEE Std 802.11™ are directed to the physical layer (layer 1) and the network interface layer (layer 2). The X.25 protocol includes three levels (i.e., layers): physical layer, data link layer and network layer. Ethernet typically applies to LANs (local area networks) and X.25 typically applies to WANs (wide area networks). Interconnected devices in a LAN may typically be separated by one kilometer or less while a WAN may be worldwide.

TCP/IP includes IP which is a primary protocol used at layer 3 (i.e., Internet) and TCP. TCP and/or UDP may be used at layer 4 (i.e., transport). Both TCP and UDP are end-to-end protocols that allow applications to communicate. For TCP, the communication unit is a TCP segment that includes a segment header and a payload. The segment header includes a source port and a destination port configured to identify a sending application and a receiving application, respectively. For UDP, the communication unit is a UDP datagram that includes a UDP header and UDP payload. Similar to TCP, the UDP header includes a source port and destination port. Thus, source and destination ports may be understood as logical ports rather than physical ports. A plurality of logical ports may share one physical port. TCP is configured to provide connection-oriented service between applications while UDP is configured to provide connectionless service. In connection-oriented service, a path (i.e., connection) is established between endpoints (i.e., source and destination) prior to information being transferred and the connection may be broken down after information transfer completes. In connection-less service, packets may be sent at any time without an established path and each packet includes a destination identifier, i.e., destination address, configured to allow network device(s) to route the packet to its destination.

SSL and TLS correspond to cryptographic protocols configured to provide communication security. SSL and TLS may be implemented at, e.g., layer 4, between TCP and the application layer in the five-layer reference model. SSL and TLS are configured to authenticate at least one end point and to exchange a symmetric key if authentication is successful. The symmetric key may then be used to encrypt information exchanged between the end points. SSL and TLS are configured to provide privacy (e.g., encrypted messages), integrity (e.g., message digests configured to detect whether a message was altered during transmission) and authentication (e.g., verifying identity using digital certificates).

The NRO may thus be configured to implement one or more of the communication protocols, as described herein. Similarly, the underlying network and/or end systems may be configured to implement one or more of the communication protocols. In some embodiments, the communication protocol(s) implemented by the end systems may not be the same communication protocol(s) implemented by the underlying network.

The NRO is configured to appear to the end systems as providing network connectivity between the plurality of end systems such that any two end systems may be one network hop from each other. "Network hop" corresponds to a network routing device that network traffic (e.g., frames) traverses during travel between the two end systems. In the underlying network, network traffic may traverse one or more network hops during its travel.

"Network device" includes, but is not limited to, a router, a switch, a hub, a bridge and/or a combination thereof. A router is configured to interconnect a plurality of possibly heterogeneous networks and to forward layer 3 traffic (e.g., IP datagrams). A bridge is configured to connect two individual networks and to forward layer 2 (e.g., Ethernet) frames. A switch is configured to interconnect a plurality of user devices and to forward layer 2 frames. A hub is configured to interconnect a plurality of user devices and/or network devices and to broadcast network traffic across all connected user devices and/or network devices. Routers, bridges and switches may perform both forwarding and routing operations. Thus, "network routing device" may include a router, a bridge and/or a switch. Forwarding includes receiving a packet on an input, selecting an appropriate output and transmitting the packet via the selected output. Routing includes determining the appropriate output.

Thus, an NRO system and method consistent with the present disclosure are configured to provide a network routing overlay to a plurality of end systems. An NRO system may be configured to operate as a router, a switch, a bridge, a hub and/or a combination thereof. The NRO, when configured to operate as a router, appears to the end systems as a single network hop. The NRO system and method are further configured to provide network traffic management functionality to an entity that may not control the underlying network.

In one or more embodiments, the NRO system may be configured to implement network traffic management functions including, but not limited to, facilitating enforcement of Quality of Service (QoS) metric(s) between the plurality of end systems, implementing adjustable Differentiated Services ("DiffServ", DS) compliant rules, complying or being compatible with IGMP (Internet Group Management Protocol), implementing static and dynamic routing, implementing specialized IP (Internet Protocol) spaces, providing reliable multicast data delivery, implementing data encryption and tunneling within the NRO system, providing redundant routing rules and paths with failover options and/or providing duplicate packet filtering, as described herein.

QoS is a metric that relates to one or more parameters associated with transmission and reception of network traffic. The parameters may include, e.g., latency, jitter, throughput, bit error rate, availability, etc. Network traffic may be divided into one or more classes and a respective QoS level may be associated with one or more of the classes. For example, voice data is sensitive to, among other things, delay (e.g., latency) and jitter. In another example, file transfers may be relatively less sensitive to latency and jitter but are sensitive to dropped packets.

A network and associated network devices have a finite capacity, e.g., finite bandwidth. A network may become congested when end systems coupled to the network attempt to transmit a volume of network traffic at a rate that approaches or exceeds the capacity of the network and/or network devices included in the network. Network device(s), e.g., routers and/or switches, may be configured to detect and respond to network congestion on a per-hop basis. For example, network devices may temporarily store received packets in one or more Tx/Rx queue(s) prior to transmission (e.g., as a result of contention for outputs). The network devices may be further configured to detect congestion by monitoring a fill level of the Tx/Rx queue(s). If the fill level approaches or exceeds a predetermined fill threshold, a network device may be configured to drop packet(s). In some cases, the network device may be configured to selectively drop a packet based, at least in part, on a traffic class of the packet. Such responses to congestion by a network device correspond to a per-hop behavior (PHB) since the responses occur at the network device (i.e., the hop).

Differentiated Services corresponds to a packet-marking protocol that may be utilized to classify packets. Unmarked packets may be classified as "best-effort" without explicit guarantee of delivery. The packet-marking protocol may comply or be compatible with the Request for Comments (RFC) 2474 published by the Internet Engineering Task Force (IETF) titled "Definition of the Differentiated Services Field (DS Field) in the IPv4 and IPv6 Headers", published in December 1998 and/or later versions of this standard. RFC 2474 includes a standardized set of router behaviors, known as "per-hop behaviors" (PHBs), to be applied to marked packets. The term PHB is configured to indicate that the behaviors apply to individual network devices rather than end-to-end services. Thus, the packet-marking may be utilized to prioritize packets for transmission and/or for selecting packets to drop in response to network congestion. RFC 2474 defines a 6-bit field in an IP header that is allocated for DiffServ code points (DSCPs). Each DSCP is a 6-bit value that identifies a particular PHB to be applied to the packet. The 6-bit DSCP provides for up to 64 PHBs. PHBs include, for example, expedited forwarding ("EF") configured to indicate that the associated packet should be forwarded with minimal delay and loss and assured forwarding ("AF") that relates a likelihood (i.e., probability) of packets being dropped to congestion level. EF PHB may comply or be compatible with the RFC 3246 published by the IETF titled "An Expedited Forwarding PHB (Per-Hop Behavior)", published in March 2002 and/or later versions of this standard.

Internet Group Management Protocol (IGMP) is a communications protocol that may be used by computing devices and adjacent routers on IP networks to establish multicast group memberships. Multicast, a form of broadcast, corresponds to delivery of packets to a specified subset of user devices in a given network. The IGMP protocol may comply or be compatible with one or more of RFC 1112 published August 1989 and titled: "Host Extensions for IP Multicasting", RFC 2236 published November 1997 and titled: "Internet Group Management Protocol, Version 2", RFC 3376 published October 2002 and titled: "Internet Group Management Protocol, Version 3" and/or RFC 4604 published August 2006 and titled: "Using Internet Group Management Protocol Version 3 (IGMPv3) and Multicast Listener Discovery Protocol Version 2 (MLDv2) for Source-Specific Multicast", and/or later versions of these standards. All of the foregoing IGMP standards were published by the IETF. A hub may be configured to implement multicast.

In static routing, a network device may be configured to make forwarding decisions based, at least in part, on a manually-configured routing table. Static route(s) may be manually configured by, e.g., a network administrator, and may not change when the network is changed or reconfigured. Dynamic routing enables network devices to select paths based on current network layout and to thus, adjust in response to logical network layout changes. Dynamic routing may use one or more protocols to determine routes. In dynamic routing, the routing protocol operating on the network device is responsible for the creation, maintenance and updating of a dynamic routing table. In static routing, the system administrator is responsible for the creation, maintenance and updating of the static routing table. Static routing and dynamic routing are not mutually exclusive. Both dynamic routing and static routing may be used on a network device to maximize routing efficiency and/or to provide default routes if, for example, dynamic routing information becomes unavailable.

A specialized IP space corresponds to a first subset of user devices in a first network and a second subset of user devices in a second network where the first subset is configured to communicate with the second subset. Specialized IP spaces may include, but are not limited to, private IP address spaces where respective subsets of user devices perform a specialized set of tasks. The communication goals and requirements of a specialized IP space may be specific to the IP space and each network may be designed and managed accordingly. Specialized IP spaces contrast with more general purpose networks that are configured to serve a broader set of devices and data flows. An NRO system consistent with the present disclosure may be configured to provide connectivity between a plurality of specialized IP spaces and to provide control and management of an apparent network interconnect between the specialized IP spaces, even when the network underlying the NRO system is a general purpose network.

Typically, multicast data delivery is "best-effort". In other words, there is no guarantee that transmitted packets will be delivered to their destination. In reliable multicast delivery, delivery is guaranteed. Multicast transmissions are typically UDP, and are thus, "best-effort". In other words, there is no guarantee that multicast datagrams will arrive at their destination. An NRO system consistent with the present disclosure may be configured to provide reliable multicast delivery. For example, NRO frames may be transported between the NRO master and NRO RSs using TCP. In another example, NRO frames may be transported between the NRO master and NRO RSs using UDP and retry support may be provided in, e.g., NRO master module and/or NRO RS module.

Tunneling relates to characteristics of a packet when a first network protocol used to encapsulate a first payload and a second protocol used to encapsulate the encapsulated first payload in a second payload are not the same. For example, tunneling may be used to carry a payload over an incompatible delivery network. In another example, tunneling may be used to provide a secure path through an untrusted network. Data encryption and tunneling may not typically exist in conventional routers because the internal details of the conventional routers are not typically exposed outside the router. For an NRO system consistent with the present disclosure, the network frame may be encrypted prior to being encapsulated in the NRO frame payload. Further, the protocol(s) used in the network frame may be different from the protocol(s) used to encapsulate the NRO message.

Thus, an NRO system consistent with the present disclosure may implement one or more per-hop behaviors. Since the NRO system is configured as a single network device coupling two end systems, the per-hop behavior provides end-system to end-system traffic management. QoS metrics, for example, may then be defined and/or enforced end-system to end-system.

Attention is directed to FIG. 1 which depicts an exemplary system block diagram of a network system 100 including a network routing overlay (NRO) system 102 consistent with various embodiments of the present disclosure. NRO system 102 is configured to couple two or more end systems 104A, . . . , 104m to support network communication (i.e., transmission and/or reception of frames) between the end systems 104A, . . . , 104m. NRO system 102 may be configured to appear as one network device coupling any two end systems. NRO system 102 is configured to expose a plurality of NRO interfaces 103A, . . . , 103m to a plurality of end systems 104A, . . . , 104m and to provide network device functionality to the plurality of end systems 104A, . . . , 104m as an overlay on an underlying network. NRO system 102 may thus be configured to provide functionality of a router, a switch, a bridge, a hub and/or a combination thereof.

The NRO system 102 may be coupled to each of a plurality of end systems 104A, 104B, . . . , 104m at a respective NRO interface 103A, . . . 103m. Each end system 104A, 104B, . . . , 104m may include one or more user device(s) and a network device configured to couple the user devices (wired and/or wirelessly) to each other and/or to NRO system 102 at NRO interface(s) 103A, . . . , 103m. For example, end system 104A includes user device(s) 112A, . . . , 112n and network device 110 and end system 104B includes user device(s) 116A, . . . , 116p and network device 114.

NRO system 102 is configured to couple each end system, e.g., end system 104A, to one or more other end system(s), e.g., end system(s) 104B, . . . , 104m. For example, a user device, e.g., user device 112A, may transmit and/or receive network frame(s) to and/or from another user device, e.g., user device 116A, included in end system 104B, via NRO system 102. Each end system 104A, 104B may be connected to NRO system 102 at respective NRO interfaces 103A, 103B. Thus, network device 114 may appear to be one network device (NRO system 102) from network device 110 and both network devices 110, 114 may be unaware of the underlying network. The NRO system 102 may then be configured to implement one or more network traffic management functions to manage and/or coordinate communication between the end systems without controlling the underlying network(s). For example, congestion at any NRO interface may be detected and centrally managed, providing a system-wide response, as described in more detail below.

Network system 100 may further include a network 106. For example, network 106 may be an internetwork and may thus include one or more interconnected networks. Network 106 may include one or more individual networks configured to implement one or more communication protocols. For example, network 106 may correspond to the Internet. NRO system 102 may be coupled to network 106 via one or more non-NRO interface(s) 105A, . . . , 105r. Non-NRO interface(s) 105A, . . . , 105r are configured to provide network connectivity between an end system 104A, 104B . . . , or 104m, network 106 and/or communication partner(s) that are not NRO RSs. For example, the communication partner(s) may include user device(s) and/or other networks.

NRO system 102 includes an NRO master 120 and a first plurality of NRO remote systems (RSs) 122A, . . . , 122q coupled to a second plurality of NRO interfaces 103A, . . . , 103m. Physical locations of the NRO master 120 and/or one or more of the NRO RSs 122A, . . . , 122q may be geographically separate. For example, NRO master 120 and/or one or more of NRO RS(s) 122A, . . . , 122q may be separated by on the order of tenths, ones, tens, hundreds or thousands of miles. Such distances may be transparent to NRO master 120, NRO RSs 122A, . . . , 122q and end systems 104A, . . . , 104m.

Initially, NRO master 120 may be configured to discover available (i.e., active) NRO RS(s) 122A, . . . , 122q and/or each active NRO RS 122A, . . . , 122q may be configured to discover NRO master 120, as described herein. During operation, additional NRO RS(s) 122A, . . . , 122q may become available and/or active NRO RS(s) may become inactive (e.g., unavailable). Thus, NRO RS(s) may be added to or removed from NRO system 102, dynamically, initially and/or during operation.

After discovery, a respective data channel 130A, . . . , 130q and a respective control channel 132A, . . . , 132q may be established between NRO master 120 and each NRO RS 122A, . . . , 122q. The data channels 130A, . . . , 130q and control channels 132A, . . . , 132q may traverse network 106. In other words, network 106 may correspond to the underlying network that provides physical network connectivity between NRO master 120 and NRO RSs 122A, . . . , 122q.

Each control channel 132A, . . . , 132q is configured to carry control information, e.g., commands, requests and/or data, from the NRO master 120 to a respective NRO RS 122A, . . . , 122q and/or notifications, replies and/or data from the respective NRO RS 122a, . . . , 122q to the NRO master 120. The control information is configured to allow the NRO master 120 to receive, e.g., congestion status, from the NRO RSs 122A, . . . , 122q and to provide e.g., network traffic management commands to the NRO RS(s) 122A, . . . , 122q. Thus, the NRO master 120 may be provided visibility to network conditions at NRO RSs 122A, . . . , 122q and NRO interfaces 103A, . . . , 103m that may be located a distance from the NRO Master 120. Based, at least in part, on the network conditions, the NRO master 120 may then provide centralized management of the network system 100.

Each data channel 130A, . . . , 130q is configured to carry NRO frames between a respective NRO RS 122A, . . . , 122q and the NRO master 120. Each NRO frame is configured to include at least one network frame received from a source end system 104A, . . . , 104m and/or destined for a destination end system 104A, . . . , 104m prepended with a respective NRO prefix and encapsulated in the NRO frame payload. NRO frames may be transmitted from an NRO RS to the NRO master 120 and/or from the NRO master 120 to one or more NRO RS(s) 122A, . . . , 122q. Providing separate control and data channels is configured to facilitate communication of control information. For example, control information may be assigned a relatively higher priority and/or data may be assigned a relatively lower priority related to scheduling for transmission.

Figure 2A:
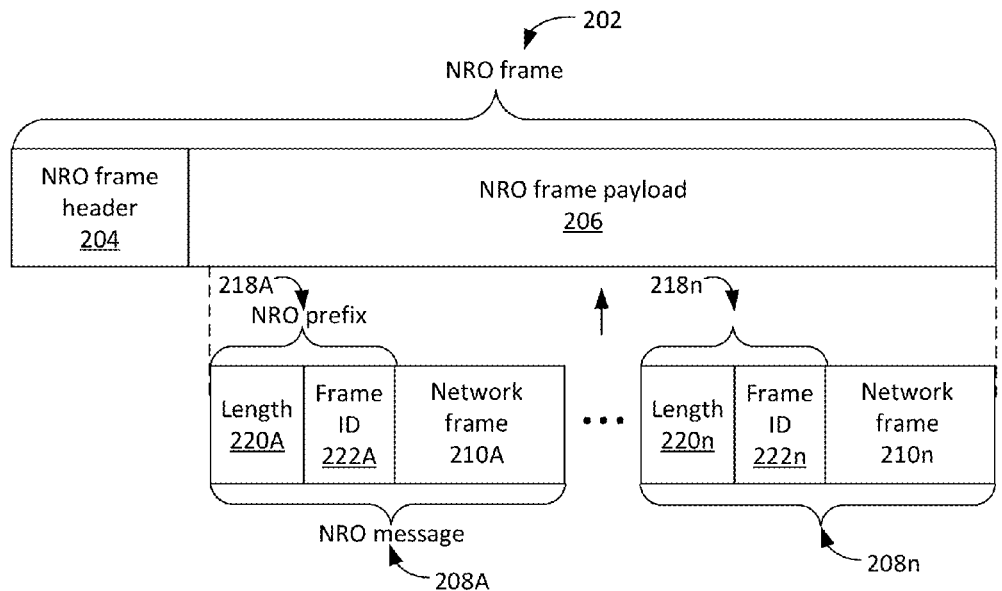
FIG. 2A depicts an exemplary NRO frame consistent with various embodiments of the present disclosure.

FIG. 2A depicts an exemplary NRO frame 202 consistent with various embodiments of the present disclosure. The NRO frame 202 includes an NRO frame header 204 and an NRO frame payload 206. The NRO frame payload 206 includes one or more NRO message(s) 208A, . . . , 208n. Each NRO message 208A, . . . , 208n includes a respective network frame 210A, . . . , 210n prepended with a respective NRO prefix 218A, . . . , 218n that includes a respective length 220A, . . . , 220n and a respective frame identifier (ID) 222A, . . . , 222n. A network frame 210A, . . . , 210n may be received by an NRO RS from an end system via an NRO interface. Each network frame 210A, . . . , 210n is configured to be compatible with a communication protocol utilized by the end system. In an embodiment, a non-NRO frame may be received by the NRO master via a non-NRO interface. For example, the non-NRO frame may correspond to a network frame.

Each length 220A, . . . , 220n may correspond to a length (e.g., in bytes) of the respective network frame 210A, . . . , 210n. Each frame ID 222A, . . . , 222n is configured to identify the respective network frame 210A, . . . , 210n in a sequence of network frames. For example, the frame ID 222A, . . . , 222n may be a hash of the associated network frame 210A, . . . , 210n. Hashing is configured to generate a fixed length (e.g., fixed number of bits) output from an arbitrary length input, i.e., to map the arbitrary length input to the fixed length output. Hashing may be used to accelerate lookup functions.

The length 220A, . . . , 220n and frame ID 222A, . . . , 222n may occupy a predetermined portion of the NRO message 208A, . . . , 208n. The length 220A, . . . , 220n may occupy a first number of bits (length field) and the frame ID 222A, . . . , 222n may occupy a second number of bits (frame ID field). For example, the length field 220A, . . . , 220n may be some number of bytes (eight bits per byte). For example, the length of the length field 220A, . . . , 220n may be two bytes (eight bits per byte). Of course, the length of the length field 220A, . . . , 220n may be relatively larger or relatively smaller than two bytes. Similarly, the frame ID field may be some number of bytes. For example, the frame ID field may be four bytes. Of course, the length of the frame ID 222A, . . . , 222n may be relatively larger or relatively smaller than four bytes.

The NRO prefix is configured to be utilized by an NRO master, e.g., NRO master 120, and/or NRO RS, e.g., NRO RS 122A, . . . , 122q, to extract and identify each network frame from an NRO payload. The frame length is configured to indicate to the NRO master and/or NRO RS a number of bytes to read, the number of bytes corresponding to a length of the associated network frame. For example, an NRO RS is configured to generate an NRO message for each received network frame by determining a length of a received network frame, generating a frame ID for the network frame and prepending a respective NRO prefix to each received network frame. One or more NRO messages may then be encapsulated in an NRO frame and transmitted to the NRO master. The NRO master is configured to utilize the NRO prefix to extract the network frame and to then make a forwarding decision for the extracted network frame. If the forwarding decision is to transmit the network frame to another NRO RS, then the NRO master is configured to generate a new NRO message by generating a new NRO prefix and prepending the new NRO prefix to the network frame. One or more new NRO messages may then be encapsulated in a new NRO frame and transmitted to the destination NRO RS. When an NRO RS (i.e., a destination NRO RS) receives the new NRO frame, the destination NRO RS is configured to utilize the new NRO prefix to extract the network frame and to then transmit the extracted network frame out an associated NRO interface. If the forwarding decision is to transmit the network frame to a destination that is coupled to the NRO master by a non-NRO interface, e.g., non-NRO interface 105A, the NRO master is configured to transmit the network frame out the non-NRO interface 105A.

Figure 2B:
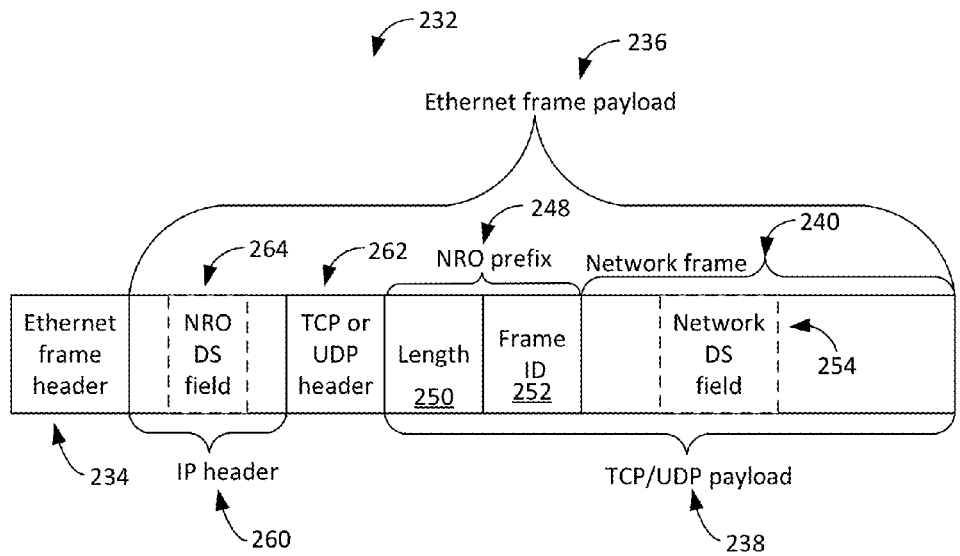
FIG. 2B depicts an exemplary Ethernet NRO frame consistent with one embodiment of the present disclosure.

FIG. 2B depicts an exemplary Ethernet NRO frame 232 consistent with one embodiment of the present disclosure. The Ethernet NRO frame 232 corresponds to NRO frame 202 for an Ethernet compatible communication protocol.

The Ethernet NRO frame 232 includes an Ethernet frame header 234 and an Ethernet frame payload 236. The Ethernet frame header 234 corresponds to NRO frame header 204 and the Ethernet frame payload 236 corresponds to the NRO frame payload 206. In this example, the Ethernet frame payload 236 includes one NRO message encapsulated in a TCP/UDP payload 238. The NRO message includes one network frame 240 and a prepended NRO prefix 248 that includes length 250 and frame ID 252. The Ethernet frame payload further includes a TCP or UDP header 262. The TCP/UDP payload 238 and TCP or UDP header 262 are encapsulated by an IP header 260. Thus, the Ethernet frame payload 236 corresponds to an IP datagram. The network frame 240 includes a network differentiated services (DS) field 254. The IP header 260 includes an NRO DS field 264. The NRO DS field 264 and/or the network DS field 254 may be utilized by an NRO master when making, e.g., scheduling decisions, as described herein.

Turning again to FIG. 1, a user device, e.g., user device 112A, with data to transmit is configured to generate a network frame for provision to, e.g., network device 110. The network frame is configured to include at least the data to transmit in an associated network frame payload. The network frame is further configured to include a network frame header that includes control and routing information for the network frame. A particular format of the network frame depends on a communication protocol enabled in end system 104A and selected by the user device 112A. The network frame may include a network address corresponding to NRO interface 103A as "next hop" destination address. For example, for an Internet reference model, the next hop destination address may correspond to a MAC address associated with NRO interface 103A (i.e., the MAC address of an external network interface of NRO RS 122A). Thus, the network frame from user device 112A may be routed to the network interface of NRO RS 122A via network device 110 and NRO interface 103A.

Each NRO RS 122A, . . . , 122q is configured to receive one or more network frame(s) from a respective end system 104A, . . . , 104m, analyze each received network frame and generate a respective NRO prefix based, at least in part, on the associated received network frame. Each NRO RS 122A, . . . , 122q is further configured to generate one or more NRO message(s), each NRO message including the respective NRO prefix prepended to the associated network frame and encapsulate the NRO message(s) in an NRO frame. The length and the frame ID of each NRO prefix may then be utilized by NRO master 120 to extract and identify the respective network frame.

For example, NRO RS 122A may be configured to receive one or more network frame(s) from user device 112A. NRO RS 122A may then be configured to determine a respective length of each received network frame. NRO RS 122A may then be configured to generate a respective frame ID associated with each network frame. For example, each frame ID may be a hash of the associated network frame. NRO RS 122A may then generate one or more NRO message(s) by prepending the respective length and the respective frame ID to each associated network frame. NRO RS 122A may then encapsulate the NRO message(s) according to an appropriate protocol stack to produce a corresponding NRO frame. The NRO message(s) may then be included in the NRO frame's payload. The NRO frame may then be transmitted to the NRO master via data channel 130A. Control and/or routing information included in each network frame may then be ignored by the underlying network since each network frame is included in the NRO payload. Each network frame may be extracted by the NRO master 120 based, at least in part, on a respective NRO prefix.

In some embodiments, a plurality of NRO RSs (e.g., group 124 that includes NRO RSs 122B, . . . , 122k) may be coupled to one NRO interface, e.g., NRO interface 103B. In these embodiments, external network interface addresses of NRO RSs 122B, . . . , 122k may be set to a common value (i.e., the address of NRO interface 103B). Thus, which NRO RS 122B, . . . , or 122k of the group 124 that is supporting communication with end system 104B via NRO interface 103B at any point in time may be transparent to end system 104B, as described in more detail below. For example, a plurality of NRO RSs coupled to one NRO interface may enhance communication reliability when, for example, a respective end system is mobile. In another example, a plurality of NRO RSs coupled to one NRO interface may provide fault tolerance by allowing selection of an alternative communication path in the underlying network. Continuing with this example, the alternative communication path may be selected by selecting an alternative NRO RS in the group of RSs and thus an alternative data channel. The NRO master 120 may be configured to select a "best" NRO RS from the group of NRO RSs 122B, . . . , 122k, as described herein.

Figure 3:
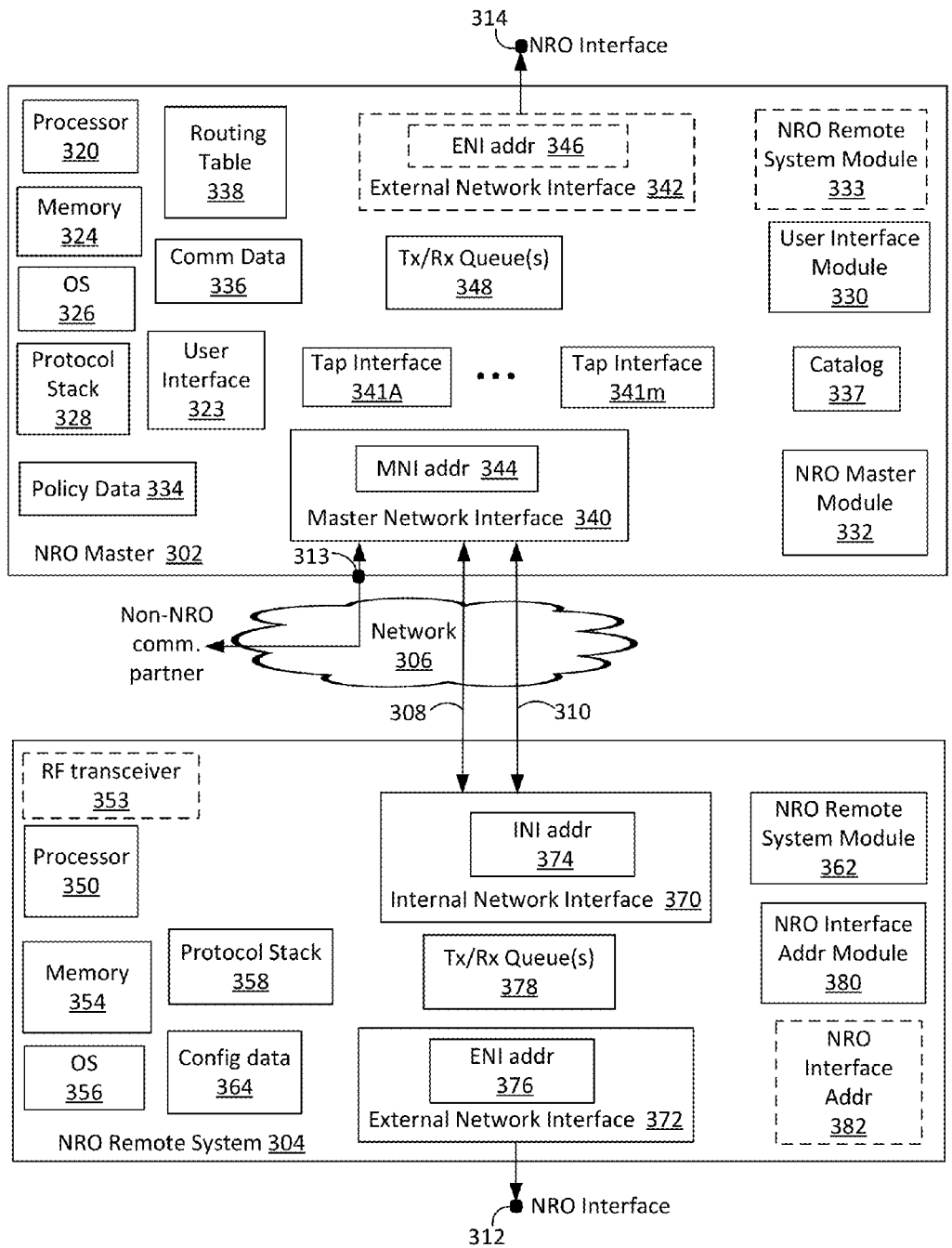
FIG. 3 depicts exemplary elements of an NRO system consistent with various embodiments of the present disclosure.

FIG. 3 depicts exemplary elements of an NRO system, e.g., NRO system 102 of FIG. 1. The exemplary elements include an NRO master 302, an NRO RS 304, an NRO interface 312 and non-NRO interface 313, consistent with various embodiments of the present disclosure. In some embodiments, the exemplary elements may include another NRO interface 314. NRO master 302 corresponds to NRO master 120 and NRO RS 304 corresponds to any of NRO RSs 122a, . . . , 122q of FIG. 1. NRO master 302 is configured to manage network routing overlay operations for an NRO system, e.g., NRO system 102, including establishing communication with one or more NRO RS(s), e.g., NRO RS 304, receiving and/or responding to user input, transmitting and/or receiving NRO frames to/from the NRO RS(s), transmitting and/or receiving non-NRO frames on non-NRO interface 313, extracting network frames from NRO frames, scheduling, forwarding and/or routing of network frames, generating NRO messages, encapsulating NRO message(s) in NRO payload(s) and/or implementing one or more network traffic management functions. NRO master 302 may be further configured to control operations of the NRO RS(s) and/or request information from the NRO RS(s). Network traffic management functions may be implemented based, at least in part, on one or more of congestion detected at the NRO interface(s), policy, and/or user input. For example, forwarding decisions may be adjusted based, at least in part, on congestion detected at the NRO interface(s). In some embodiments, NRO master 302 may be configured to receive network frame(s) on NRO interface 314.

NRO RS 304 is configured to couple an end system connected to NRO RS 304 at NRO interface 312 to NRO master 302. NRO RS 304 is configured to receive network frames from the end system, to generate a respective NRO message for each received network frame, to encapsulate one or more NRO message(s) in an NRO payload of an associated NRO frame and to transmit the NRO frame to the NRO master 302. NRO RS 304 is further configured to receive NRO frames from NRO master 302, extract one or more network frame(s) from the NRO frame payload and transmit the extracted network frame(s) to the end system via the NRO interface 312. NRO RS 304 is configured to receive commands and/or data from NRO master 302, to interpret the received commands and respond accordingly.

FIG. 3 further depicts a network 306, an underlying network over which an NRO system consistent with the present disclosure may operate. For example, network 306 may be an internetwork and may thus include one or more interconnected networks. Underlying network 306 is configured to provide the underlying connectivity between the NRO RS 304 and the NRO master 302. Network 306 may include one or more individual networks configured to implement one or more communication protocols. For example, network 306 may correspond to the Internet. Non-NRO interface 313 may be coupled to network 306. Thus, non-NRO interface 313 may be configured to couple a non-NRO communication partner to NRO master 302 and, thereby to NRO RS 304.

NRO master 302 may be coupled to NRO RS 304 by a control channel 308 and a data channel 310. For example, the control channel 308 and/or data channel 310 may be connection-oriented (e.g., TCP) and/or may be configured to provide cryptographic security (e.g., TLS or SSL). In another example, the control channel 308 and/or data channel 310 may be connectionless (e.g., UDP). Control frames that include data and/or control information as payload may be carried by control channel 308. NRO frames may be carried by data channel 310. Control frames and NRO frames carried by the control and data channel, respectively, are configured to be routed and/or forwarded by underlying network 306. Each NRO frame is configured to include NRO message(s) in the NRO frame payloads. The NRO message(s) may be ignored by the underlying network 306 as payload data. The network frame(s) may then be extracted from a received NRO payload and identified by the NRO master 302 and/or NRO RS 304 using the NRO prefixes (i.e., lengths and frame IDs), as described herein.

NRO master 302 and NRO RS 304 each includes a respective processor 320, 350, respective memory 324, 354 and a respective operating system OS 326, 356. Processors 320, 350 may each include one or more processing unit(s), e.g., processor core(s). Processor 320 is configured to perform operations associated with NRO master 302. Processor 350 is configured to perform operations associated with NRO RS 304. NRO master 302 and NRO RS 304 may each further include a respective protocol stack 328, 358. NRO master 302 includes routing table 338. NRO master 302 may include policy data 334 and communication data 336. NRO RS 304 may include configuration data 364. In some embodiments, NRO RS 304 may include an RF (radio frequency) transceiver 353. In these embodiments, NRO RS 304 may be configured to communicate wirelessly via RF transceiver 353 with an end system that is mobile, as described herein.

NRO master 302 may include a user interface 323 and a user interface module 330. User interface 323 is configured to provide access to NRO master 302 by a user (e.g., network engineer). User interface 323 is configured to allow the user to provide requests and/or commands to NRO master 302 and/or provide, e.g., display, results to the user. User interface 323 may thus facilitate "tuning" an NRO system, e.g., NRO system 102, by a user. Tuning may be accomplished by implementing one or more network management functions, as described herein. User interface 323 may include, but is not limited to, a display (including, e.g., a touch-sensitive display), a keyboard, a keypad, a touchpad, a pointing device (e.g., a mouse), etc.

User interface module 330 is configured to receive user input from user interface 323 and to provide NRO master output data to the user interface 323. For example, user interface module 330 may be configured to provide a graphical user interface (GUI) to user interface 323. The GUI may be configured to display user input graphics, e.g., knobs, buttons and/or switches to a user and to capture user inputs. The GUI is configured to allow the user to adjust parameters related to network traffic management and to display NRO master output data to the user. User input may be interpreted by the user interface module 330 and/or may be stored in communication data 336 and/or policy data 334.

NRO master 302 includes an NRO master module 332 configured to manage network routing overlay operations for NRO master 302. NRO master module 332 may be configured to establish communication with one or more NRO RS(s), e.g., NRO RS 304, implement network traffic management functions, extract network frames, generate NRO messages and/or control operations of the NRO RS(s) including, e.g., providing commands to and receiving responses and/or notifications from NRO RS(s). Network traffic management functions may be implemented based, at least in part, on congestion detected at the NRO interface(s), policy and/or user input.

NRO RS 304 includes an NRO RS module 362 configured to manage operations of NRO RS 304. NRO RS module 362 is configured to establish communication with NRO master 302, generate NRO message(s) for received network frame(s) (e.g., received on NRO interface 312), respond to commands from NRO master 302, provide notifications (e.g., congestion status), extract network frames from NRO frames received from NRO master 302 and/or manage transmission of extracted network frame(s) to an end system coupled to NRO interface 312.

In some embodiments, NRO master 302 may include an NRO RS module 333, an external network interface (ENI) 342 and associated ENI address 346. In these embodiments, NRO master 302 may be configured to operate as both an NRO RS and as an NRO master. NRO RS module 333 may then be configured to perform operation(s) as described herein with respect to NRO RS module 362. Thus, NRO master 302 may also be configured to provide NRO connectivity to an end system at an associated NRO interface 314.

NRO master 302 includes a master network interface 340. NRO RS 304 includes an internal network interface 370 and an external network interface 372. Master network interface 340, internal network interface 370 and each external network interface 342, 372 are configured to communicate, wired and/or wirelessly, using one or more communication protocols, as described herein.

The master network interface 340 and internal network interface 370 may be used to establish data and control channels between the NRO master 302 and NRO RS 304. The RS external network interface 372 may be used to establish connectivity with an end system via NRO interface 312. The master external network interface 342 may be used to establish connectivity with another end system via NRO interface 313. The master network interface 340 includes a master network interface (MNI) address 344. The internal network interface 370 includes an internal network interface (INI) address 374 and each external network interface 342, 372 includes a respective external network interface (ENI) address 346, 376. Thus, the INI 370 may be identified by the INI address 374 and the ENI 372 may be identified by the ENI address 376. An end system coupled to NRO interface 312 may be configured with ENI address 376 as a network address associated with NRO interface 312 and the NRO system. Similarly, ENI 342 may be identified by ENI address 346 and INI 340 may be identified by INI address 344. For example, INI addresses 344, 374 and ENI addresses 346, 376 may correspond to MAC addresses of respective network interfaces. In some embodiments, NRO RS 304 may include an NRO interface address module 380 and may include an NRO interface address 382, as described herein.

NRO master 302 and NRO RS 304 each include respective transmit and/or receive queue(s) Tx/Rx Queue(s) 348, 378. The Tx/Rx queues 348, 378 are configured to store received network frames and/or NRO frames prior to processing. The Tx/Rx queues 348, 378 may be further configured to store network frames and/or NRO frames to be transmitted, prior to transmission.

Thus, NRO RS 304 (i.e., each NRO RS 122A, . . . , 122q of FIG. 1) includes an external network interface 372 configured to connect a respective end system to an NRO system and an internal network interface 370 configured to couple NRO RS 304 to master network interface 340 and thereby NRO master 302 via network 306. External network interface 372 may be configured to communicate with an associated end system using a first communication protocol different from a second communication protocol used to communicate over network 306 between NRO RS 304 (i.e., internal network interface 370) and NRO master 302 (i.e., internal network interface 340).

Initially, NRO master 302 and/or NRO RS 304 may be configured to perform a discovery process in order to detect and/or recognize each other. The discovery process may include authentication of the NRO master 302 and/or the NRO RS 304. During operation, the discovery process may be repeated, e.g., to accommodate newly activated and/or available NRO RS(s).

In an embodiment, NRO master module 332 may be configured to discover NRO RS(s) in order to establish communication with the discovered NRO RS(s). For example, communication data 336 may include identifiers of NRO RS (s) permitted to be included in an NRO system with NRO master module 332. For example, the NRO RS identifier(s) may correspond to network addresses. In another example, the NRO RS identifier(s) may be IP addresses. The NRO master module 332 may be configured to discover NRO RS(s) in response to being activated, periodically after being activated and/or in response to a user input received from user interface module 330 and/or user interface 323.

In another embodiment, NRO master 302, via NRO master module 332, may be configured to establish communication with NRO RS 304 in response to a request from NRO RS module 362. For example, NRO RS module 362 may be configured to discover NRO master 302 in response to being activated, periodically after being activated and/or based, at least in part, on configuration data 364. In this embodiment, NRO RS module 362 may be requested to authenticate to NRO master module 332 to confirm the identity of NRO RS 304. NRO RS module 362 may also be configured to request authentication from NRO master 302 (i.e., NRO master module 332).

In response to discovery, master module 332 is configured to establish a tap interface 341A, . . . , 341m for each discovered RS, e.g., RS 304. A tap interface is a logical network interface. Frames sent out a tap interface may be received by a local module, e.g., NRO master module 332, and frames received on a tap interface may be provided to the tap interface by the local module. From the perspective of an OS, a tap interface and a physical network interface are network interfaces local to the OS.

Each tap interface 341A, . . . , 341m may be configured with an external network interface address (i.e., NRO interface address) of a respective discovered RS, e.g., ENI address 376 (i.e., NRO interface 312 address) of RS 304. For example, each RS may be configured to provide a respective ENI address, e.g., ENI address 376, to the master 302 and master module 332 as part of the initialization process. For example, the ENI address 376 may correspond to a MAC address. Continuing with this example, RS 304 may be further configured to provide an IP address associated with ENI 372 to master 302. Thus, a remote network interface appears to the NRO master 302 as a local network interface, extending the reach of the NRO master 302 to physical ENI 372 of NRO RS 304.

OS 326 may then be configured to receive network frames on tap interfaces 341A, . . . , 341m and to transmit network frames out the tap interfaces 341A, . . . , 341m. It may thus appear to OS 326 (and end systems 104A, . . . , 104m) that NRO interfaces, e.g., NRO interface 312, are local network interfaces of master 302. In actuality, the received network frames may be provided to the tap interfaces by master module 332 and the transmitted network frames may be received by master module 332.

After the NRO master 302 and NRO RS 304 have been discovered and/or identified, the control channel 308 and data channel 310 may be established between NRO master 302 and NRO RS 304. The control channel 308 and/or the data channel 310 may be connection-oriented or connectionless, as described herein. Whether the control channel 308 and/or data channel 310 are connection-oriented or connectionless may be determined based, at least in part, on policy data 334, communication data 336 and/or configuration data 364.

Control channel 308 and data channel 310 are configured to couple NRO master network interface 340 and NRO RS internal network interface 370. For example, master network interface 340 may include a plurality of physical network ports. In another example, master network interface 340 may be shared by a plurality of RSs, e.g. RS 304. In this example, each channel may be coupled to a logical port associated with master network interface 340 and master module 332. Similarly, a data channel and a control channel may be coupled to a logical port associated with internal network interface 370 of RS 304.

Each RS, e.g., RS 304, may be identified by INI address 374. INI address 374 may be independent of ENI address 376. INI address 374 may be utilized by, e.g., master module 332, to identify an RS of a group of RSs and/or to identify an RS to receive a command. For example, a group of RSs may share one ENI address (e.g., NRO interface address 382), as described herein. Thus, each data channel, each control channel and each RS coupled to master 302 may be identified by INI address 374, source port identifier and/or destination port identifier. A source RS and/or destination RS for each NRO frame may be similarly identified. NRO RS internal network interface 370 and master network interface 340 are configured to transmit and/or receive NRO frames.

In some embodiments, a plurality of data and control channel pairs may be established between master 302 and RS 304. For example, a plurality of control and data channel pairs may be established between NRO master 302 and NRO RS 304 with each pair associated with a different priority level (e.g., DSCP).

After the control channel 308 and data channel 310 have been established, NRO RS 304 may receive NRO frames and/or master control frames from NRO master 302 and/or transmit NRO frames and/or RS control frames to NRO master 302. The NRO frames may be transmitted/received via the data channel 310 and the control frames may be transmitted/received via the control channel 308. The master control frames may include commands and/or data from the NRO master 302 as payload. The RS control frames may include notifications, responses and/or data from the NRO RS 304 as payload.

OS 356 and/or protocol stack 358 may be configured to extract commands and/or control data (i.e., payload) from the master control frames and NRO RS module 362 is configured to interpret and/or respond to the commands. Responses to commands may include, for example, adjusting a configuration of the NRO RS 304 and/or providing requested data to the NRO master 302. NRO RS module 362 may be configured to provide notifications to the NRO master 302, e.g., related to congestion detected by the NRO RS module 362. NRO RS module 362 is configured to provide requested data and/or notifications to OS 356 and/or protocol stack 358 for encapsulation into RS control frames for transmission to NRO master 302 on data channel 310. For example, RS module 362 may write the requested data and/or notification to the control channel 310.

RS 304 is configured to connect to an end system via external network interface 372 (i.e., NRO interface 312). RS 304 is further configured to transmit and/or receive network frames to/from the end system. RS module 362 is configured to capture raw received network frames. Raw network frames contain network frame header and network frame payload. The network frame payload is configured to include data transmitted by a user device included in the end system. The network frame header includes a source address and a destination address. The source address corresponds to a network interface address of the network device that connects the end system to NRO interface 312. The destination address corresponds to the network interface address associated with NRO interface 312, e.g., ENI address 376.

Thus, RS module 362 is configured to capture network frames that include as destination network interface address, ENI address 376, the network interface address associated with a corresponding tap interface of master 302 and master OS 326. RS module 362 is configured to analyze the captured network frame to determine frame length and frame ID and to generate an associated NRO message, as described herein. The NRO message may then contain the raw network frame.

OS 326 and/or protocol stack 328 are configured to extract an NRO payload from each received NRO frame. The NRO payload may include one or more NRO message(s) from NRO RS 304. NRO master module 332 is configured to extract a length and network frame identifier from each NRO message and to then extract the associated network frame. The extracted network frame(s) may then be provided to the appropriate tap interface, e.g., tap interface 341A. The OS 326 may then route the extracted network frame(s) utilizing routing table 338. If a next destination is a non-NRO communication partner, the network frame may be transmitted out non-NRO interface 313 by master network interface 340. If a next destination is an end system, the OS 326 is configured to send the network frame out an associated tap interface, e.g., tap interface 341m. Master module 332 is configured to receive the network frame from the tap interface 341m. Master module 332 is further configured to generate an associated NRO message and to write the NRO message to an associated data channel. OS 326 may then encapsulate one or more NRO message(s) into an associated NRO frame. The associated NRO frame may then be transmitted out master network interface 340 to, e.g., internal network interface 370 via the data channel.

OS 356 and/or protocol stack 358 are configured to extract an NRO payload from each received NRO frame. The NRO payload may include one or more NRO message(s) from NRO master 302. The NRO messages from NRO master 302 may include network frame(s) received by NRO master 302 from another end system that may be coupled to NRO master 302 by another NRO interface and/or network frames received from a non-NRO communication partner. NRO RS module 362 is configured to extract a length and network frame identifier from each NRO message and to then extract the associated network frame. The extracted network frame(s) may then be stored in Tx/Rx queue(s) 378 prior to transmission to an end system coupled to NRO interface 312. Further, network frames received from an end system coupled to NRO interface 312 may be stored in Tx/Rx queue(s) 378 prior to processing for transmission to NRO master 302.

Thus, NRO master module 332 and RS module 362 are each configured to generate a respective NRO message for each received network frame by prepending received network frames with the NRO prefix, as described herein. NRO master module 332 and NRO RS module 362 is configured to provide the associated NRO message(s) to respective OS 326, 356 and/or protocol stack 328, 358 for further processing (e.g., encapsulation) to produce an associated NRO frame. The associated NRO frame may then be transmitted to NRO RS 304 or NRO master 302, respectively, via data channel 308.

Whether an NRO frame encapsulates one NRO message or more than one NRO message may depend, at least in part, on policy data and/or configuration data, e.g., policy data 334 and/or configuration data 364. For example, the policy data 334 may be set by a user and corresponding configuration data 364 may be set in response to a command from NRO master 302 to NRO RS 304. The policy data and/or configuration data may be associated with an NRO RS, with a user device included in an end system and/or a flow associated with an application executing on a user device. Including a plurality of NRO messages within a single NRO frame may result in a transmission delay for one or more of the NRO messages. Transmitting a plurality of NRO messages in one NRO frame may result in a relatively lower overhead on the communication path between the NRO RS 304 and NRO master 302, e.g., data channel 310. Such relatively lower communication overhead may be beneficial if the NRO messages are relatively small in size. In another example, if increased latency is a concern, then the NRO RS 304 and/or NRO master 302 may be configured to send NRO frames as quickly as possible with no buffering of NRO messages. In this example, one NRO message may be encapsulated in an associated NRO frame. For example, a time interval may be defined that corresponds to a time duration that OS 326 or OS 356 may wait before encapsulating and sending a received NRO message. A duration at or near zero may correspond to sending a single NRO message in an NRO payload and a longer duration may correspond to sending one or more NRO message(s) per NRO payload. Thus, the NRO master 302 and/or NRO RS 304 may be configured to reduce transmission overhead by encapsulating a plurality of NRO messages in one NRO frame for associated network frames that can tolerate the additional latency and/or to reduce latency by encapsulating one NRO message in one NRO frame.

When a plurality of NRO messages is encapsulated in one NRO frame, the plurality of NRO messages may or may not share a common destination. For example, for an NRO frame received by the NRO master 302 from an NRO RS, e.g., NRO RS 304, each of the associated network frames may have as a different destination than one or more other network frame(s) included in the NRO frame payload. In another example, for an NRO frame received by the NRO RS 304 from the NRO master 302, each associated network frame may have as destination a common end system (e.g., coupled to NRO interface 312) but may have a different user device in the end system as the ultimate destination.

Thus, an NRO system that includes NRO master 302 and a plurality of NRO RSs, e.g., NRO RS 304 may be configured to overlay underlying network 306 and to appear as one network device coupling a plurality of end systems. For example, OS 326 utilizing routing table 338 is configured to perform routing and/or forwarding operations for each network frame. Master module 332 may then adjust forwarding by, e.g., delaying transmission of associated NRO frames and/or commanding one or more NRO RSs to delay and/or drop network frames, modifying DSCP of network frames(s) prior to providing them to OS 326, etc. In this manner, end system to end system network traffic management may be implemented.

Turning again to FIG. 1, NRO master 120 is configured to manage network traffic, globally, for the NRO system 102. In support of this global management, NRO master 120 may be configured to implement network traffic management, e.g., make forwarding decisions, based, at least in part, on congestion associated with any NRO RS 122A, . . . , 122q and/or any NRO interface 103A, . . . , 103m. Each NRO RS 122A, . . . , 122q is configured to monitor for local congestion and to notify NRO master 120 if congestion is detected. Turning again to FIG. 3, NRO RS module 362 may be configured to monitor a fill level of Tx/Rx queue(s) 378. If the fill level approaches or exceeds a predetermined fill threshold, the NRO RS module 362 may be configured to notify NRO master 302 and NRO master module 332 via, e.g., control channel 308, that congestion is imminent or that congestion exists. The predetermined fill level may be included in configuration data 364.

NRO master module 332 is configured to receive respective congestion notification from each of the plurality of NRO RSs coupled to the NRO master. The NRO master module 332 may then determine a response to the congestion notification(s). The response(s) may be determined based, at least in part, on a congestion policy included in policy data 334. For example, transmission of NRO frames from uncongested NRO RS(s) may be delayed, relatively lower priority network frames and/or relatively lower priority NRO frames (based, e.g., on DSCP value(s)) may be delayed and/or dropped by master module 332 and/or RS module 362. Although the NRO master 302 may not control the underlying network 306, centralized congestion management by the NRO master 302 may affect congestion in the underlying network by controlling transmission of network traffic from and/or to NRO RSs. For example, network traffic from one or more NRO RSs may be delayed from entering the underlying network.

In an embodiment, NRO master 302 may be configured to implement a plurality of DSCP levels for one or more of the end systems. For example, NRO master module 332 may be configured to establish a connection-oriented data channel, e.g., data channel 310, between NRO 302 and NRO RS 304. Establishing the connection 310 may include specifying a DSCP value for the NRO DS field, e.g., DS field 264. The NRO master 302 may be configured to provide the DSCP value to the NRO RS 304 that may then be stored in configuration data 364. The OS 356 and/or protocol stack 358 may then be configured to include the provided DSCP value in the NRO header of frames transmitted from NRO RS 304 to NRO master 302.

In another example, NRO master module 332 may be configured to establish a plurality of connection-oriented data channels. Each data channel may then be associated with a respective DSCP value. The NRO master module 332 may be configured to provide data channel identifier-respective DSCP value pairs to the NRO RS 304. The NRO master module 332 may further command the NRO RS 304 to select an appropriate data channel based, at least in part, on a DSCP value included in a network frame (e.g., in network DS field 254). NRO RS module 362 may then store the data channel identifier-respective DSCP value pairs in, e.g., configuration data 364. NRO RS module 362 may then be configured to determine the DSCP value for each packet and to select a corresponding data channel as directed.

In another example, NRO RS 304 may be configured (by, e.g., NRO master 302 and master module 332) to copy a DSCP value from a network frame network DS field 254 to an NRO frame NRO DS field 260. Thus, a DSCP value provided by an end system and/or user device may be preserved.

In an embodiment, assignment of DSCP values may be adaptive. In other words, NRO master module 332 may be configured to adjust DSCP values based, at least in part on conditions of the underlying network. For example, the conditions may be assessed based, at least in part, on congestion levels at NRO RS(s) and/or DSCP values of NRO frames experiencing relatively more congestion effects (historical and/or current) and/or one or more user-defined metrics. User-defined metrics may be based, at least in part, on knowledge of the configuration of the underlying network.

Thus, respective DSCP values may be assigned based, at least in part, on one or more of, policy, user input, congestion levels at one or more of the NRO RS(s) and/or traffic conditions of underlying network. DSCP values may be assigned to incoming network frames by respective NRO RSs and/or by NRO master to frames prior to transmission to a destination NRO RS. DSCP values may be utilized to facilitate enforcement of an end system to end system QoS.

An NRO system consistent with the present disclosure may be configured to provide reliable multicast delivery. In multicast delivery, frames received from one end system may have as destinations a plurality of other end systems. Multicast delivery is typically best-effort and therefore "unreliable", i.e., there is no guarantee of frame delivery. In an embodiment consistent with the present disclosure, NRO master module 332 may configure the NRO RS, e.g., NRO RS 304, to utilize TCP to encapsulate NRO messages associated with network frames received from a source end system. NRO master module 332 may similarly configure master OS 326 to encapsulate NRO messages generated for the associated received network frames for transport to the NRO RSs associated with destination end systems. Thus, reliable multicast delivery may be provided. In another example, NRO frames may be transported between the NRO master and NRO RSs using UDP and retry support may be provided in, e.g., NRO master module 332 and/or destination NRO RS modules, e.g., NRO RS module 362.

NRO master 302 includes an NRO routing table 338. The routing table 338 may include one or more of source and destination end system identifiers, INI addresses for active NRO RSs, NRO interface address(es) associated with NRO RSs in a group configuration, control and data channel identifiers as well as associated characteristics, e.g., DSCP value(s), etc. NRO master 302 may be configured to provide static and/or dynamic routing. For example, one or more static routes may be set in response to a user input. The static routes may be configured to allow user control for, e.g., testing, and/or may be configured to provide default routes. Dynamic routes may be determined by, e.g., NRO master module 332, and may be based, at least in part, on conditions in the NRO system. For example, routes may be adjusted in response to an NRO RS becoming active or inactive. In another example, routes may be adjusted dynamically based on policy and/or congestion level.

In some embodiments, NRO master module 332 may be configured to monitor the data and/or control channels for, e.g., connection errors, (for connection-oriented channel). In these embodiments, if a connection error occurs, the NRO master module 332 is configured to place the channel with the connection error in an inactive state. The NRO master module 332 is further configured to not attempt to read from or write to a connection that is in the inactive state. A tap interface associated with the data channel may be retained.

Thus, an NRO system consistent with the present disclosure may be configured to provide single hop network device functionality for a plurality of end systems. The NRO system may be configured to perform operations of, e.g., a router, a switch, a bridge, a hub and/or a combination thereof. For example, operations of an NRO system 102 consistent with the present disclosure may comply or be compatible with the Request for Comments (RFC) 1812 published by the Internet Engineering Task Force (IETF) titled "Requirements for IP Version 4 Routers", published in June 1995 and/or later versions of this standard. In this example, NRO master 120, 302 may be configured to provide router functionality. The network device functionality may be implemented by, e.g., NRO master 302 that may then control the operations of a plurality of NRO RSs, as described herein.

Turning again to FIG. 1, in some embodiments, a plurality of NRO RSs, i.e., group 124, may be coupled to one NRO interface, e.g., NRO interface 103B. The group NRO RS configuration may facilitate fault tolerance for, e.g., faults, in the underlying network and/or may provide enhanced security. In other words, an NRO system that includes the NRO master and a plurality of NRO RSs in the group NRO RS configuration may provide redundant routing rules and paths with failover options. For example, the NRO master 120 may be configured to select a first NRO RS, e.g., NRO RS 122B, for communicating with end system 104B and to select a second NRO RS, e.g., NRO RS 122C from the group 124 in response to a communication channel failure between NRO RS 122B and the NRO master 120. Thus, a fault in the underlying network that affects a communication path in the NRO system 102 may be accommodated by an NRO system that includes a group 124 of NRO RSs coupled to a single NRO interface. In another example, the NRO master 120 may be configured to change primary and secondary mode configurations of NRO RSs, as described herein, and/or NRO RSs selected for coupling with NRO interface 103B periodically and/or randomly, as a security measure.

The group NRO RS configuration may facilitate routing continuity from the perspective of end system 104B, communicating over a path that includes the NRO system 102. For example, end system 104B may be a mobile end system. Mobile end systems may include, but are not limited to, ground vehicles (e.g., automobiles, trains, etc.), airborne systems (e.g., aircraft, airborne sensing systems, etc.). Mobile end system 104B may be configured to communicate wirelessly with one or more ground-based transceivers. For example, network device 114 may include a router that may include an RF transceiver. Each NRO RS 122B, . . . , 122k in group 124 may include respective RF transceivers, e.g., RF transceiver 353 of FIG. 3.

The ground-based transceivers, e.g., RF transceiver 353, may have limited, possibly overlapping reception ranges. As the mobile end system 104B travels, it may leave the reception range of a first ground-based transceiver and enter the reception range of a second ground-based transceiver. Without an NRO system that includes a group NRO RS configuration, transitioning from one ground-based transceiver to another ground-based transceiver may result in loss of data during the transition. Further, a first communication path that includes the first ground-based transceiver may be different from a second path that includes the second ground-based transceiver. Thus, transitioning from the first ground-based transceiver to the second ground-based transceiver may result in a path change so that a secure connection may be lost. Establishing a new secure connection may take time, resulting in potentially more data loss.

A group NRO RS configuration consistent with the present disclosure may facilitate such transitions and reduce and/or eliminate data loss during the transition. An NRO system 102 that includes group 124 may result in transparent path changes from the perspective of the communicating end systems, e.g., end system 104B and end system 104A. In other words, from the perspective of the end systems 104A, 104B, the mobile end system 104B may remain coupled to the NRO system 102 at one NRO interface, e.g., NRO interface 103B, when any one or more NRO RSs, e.g., NRO RSs 122B, . . . and/or 122k, of the group 124, is actually receiving and/or transmitting from/to the mobile end system 104B. Thus, a network address associated with the NRO interface 103B may not change during a transition between ground-based receivers.

The following discussion may be best understood when considering both FIG. 1 and FIG. 3. Group 124 includes a plurality of NRO RSs 122B, . . . , 122k that are coupled to NRO interface 103B. NRO interface 103B may then correspond to NRO interface 312. Each NRO RS 122B, . . . , 122k corresponds to NRO RS 304. End system 104B is a mobile end system, as described herein. Network device 114 of mobile end system 104B may then include, e.g., a switch, configured to couple user devices 116A, . . . , 116p and a router that includes an RF transceiver configured to couple the mobile end system 104B to NRO interface 103B wirelessly.

Each NRO RS 122B, . . . , 122k includes an external network interface and ENI address, e.g., external interface 372 and ENI address 376. Each NRO RS 122B, . . . , 122k may further include an NRO interface address module and an NRO interface address, e.g., NRO interface address module 380 and NRO interface address 382. The NRO interface address 382 may be the same for each NRO RS 122B, . . . , 122k in the group 124. Each NRO RS 122B, . . . , 122k includes an internal network interface and INI address, e.g., internal interface 370 and INI address 374. Respective INI addresses 374 are unique for each NRO RS 122B, . . . , 122k.

Each NRO RS 122B, . . . , 122k may be configured as a member of the group 124 prior to deployment and/or after deployment, e.g., during initialization operations. For example, configuration data 364 may include a flag configured to indicate whether an NRO RS is a member of a group. Configuration data 364 may further include a group identifier so that NRO system 102 may be configured to accommodate a plurality of groups of NRO RSs. If an NRO RS is a member of a group, NRO interface address module 380 may be configured to cause external network interface 372 to operate with an NRO interface address associated with the group, e.g., NRO interface address 382, as its network interface address, i.e., as an ENI address associated with ENI 372. If the underlying network, e.g., underlying network 306, is Ethernet compatible, the NRO interface address module 380 may be configured to cause external network interface 372 to operate with a group MAC address and a group IP address. Each member of the group 124 may be similarly configured. In some embodiments, the NRO interface address 382 may correspond to the ENI address 376 of one of the NRO RSs, e.g., one of 122B, . . . , 122k, in the group 124. A mobile end system, e.g., end system 104B coupled to NRO system 102 at NRO interface 103B (e.g., NRO interface 312) may be configured to recognize NRO interface address 382 as the network interface address associated with NRO interface 103B. Transitioning between NRO RSs 122B, . . . , 122k in the group 124 may then be transparent to the mobile end system 104B.

During operation, one or more of the NRO RS(s) 122B, . . . , 122k in group 124 may be receiving network frames from the mobile end system 104B. The NRO RS(s) 122B, . . . , 122k may typically be configured to generate an associated NRO message for each received network frame, encapsulate one or more NRO message(s) in an NRO frame and transmit the associated NRO frame to the NRO master 120, as described herein. The NRO master 120 may possibly receive more than one NRO frame containing a same network frame (i.e., duplicate network frames) from a plurality of NRO RSs 122B, . . . , 122k. For example, whether a received network frame is a duplicate of another received network frame may be determined based, at least in part, on the frame ID. Frame IDs of received network frames may be stored in catalog 337. A frame ID of each new received frame may then be compared to prior received frame IDs stored in catalog 337. The NRO master 120 may then be configured to discard duplicate network frames.

In an embodiment, one NRO RS, e.g., NRO RS 122B, may be selected (i.e., designated) as primary and configured to operate in a primary mode. In this embodiment, other (i.e., unselected) NRO RS(s), e.g., NRO RS(s) 122C, . . . , 122k in the group 124 may be designated secondary and configured to operate in a secondary mode. For example, the selection and configuration may be performed during initialization operations. For example, an operational mode identifier corresponding to primary or secondary may be included in configuration data 364. NRO master module 332 may be configured to select the NRO RS to be designated primary. For example, the selection may be based, at least in part, on a user input, a signal strength associated with network frames received by each NRO RS, a default selection and/or one or more other selection criteria.

The NRO RS 122B operating in primary mode may be configured to transmit full NRO message(s) that each include a received network frame(s) in its associated NRO frame payload. The NRO RS(s) 122C, . . . , 122k operating in secondary mode may be configured to one or more of: not transmit, transmit the NRO prefix in the NRO payload and/or transmit the full NRO message(s) in the NRO payload, based, at least in part, on a transmission indicator. For example, a respective transmission indicator may be stored in configuration data 364 of each NRO RS(s) 122C, . . . , 122k. Respective transmission indicators may or may not be the same for each member 122C, . . . , 122k of the group 124. Not transmitting may minimize network traffic from the group 124 to the NRO master 120. Transmitting the full NRO message(s) may increase the network traffic from the group 124. Transmitting the NRO prefix is configured to allow the NRO master 120 to detect when the mobile end system 104B moves out of range of the primary NRO RS 122B transceiver and into a range of a secondary NRO RS, e.g., NRO RS 122C, transceiver.

For example, based at least in part, on the network frame ID, the NRO master 120 may detect a transition between NRO RS transceivers (e.g., from NRO RS 122B to NRO RS 122C) if an NRO frame containing at least the NRO prefix is received by the NRO master 120 from a second NRO RS in the group 124 operating in secondary mode (e.g., NRO RS 122C) before an NRO frame containing the associated network frame is received from a first NRO RS in the group 124 operating in primary mode, i.e. NRO RS 122B. The NRO master 120 may be configured to identify each NRO RS 122B, . . . , 122k based, at least in part, on respective INI address 374. The NRO master 120 may be configured to command the second NRO RS 122C (via the control channel) to switch to primary mode and the first NRO RS 122B to switch to secondary mode. The NRO master 120 may further command the first NRO RS 122B to transmit any outstanding network frames and/or NRO frames that may be included in its associated Tx/Rx queues to the NRO master 120 via the control channel, e.g., control channel 132B. The NRO master 120 may then provide the outstanding frames to the second NRO RS 122C via its associated data channel 130C. The second NRO RS 122C may then be configured to process the outstanding frames. Thus, a seamless transfer between two NRO RSs 122B and 122C in the group 124 may be implemented.

Thus, a group NRO RS configuration (i.e. a plurality of NRO RSs coupled to one NRO interface) may facilitate fault tolerance for faults in the underlying network and/or transitions between ground-based transceivers for a mobile end system. Delays and/or data loss may thus be reduced and/or avoided.

Thus, an NRO system consistent with the present disclosure may provide single network device connectivity between a plurality of end systems. The NRO system is configured to facilitate centralized network traffic management for network frames transmitted to and/or received from the end systems. In one or more embodiments, the NRO system may be configured to facilitate enforcement of QoS metric(s) between the plurality of end systems, implement adjustable DiffServ compliant rules, comply or be compatible with IGMP, implement static and dynamic routing, implement specialized IP spaces, provide reliable multicast data delivery, implement data encryption and tunneling within the NRO system, provide redundant routing rules and paths with failover options and/or provide duplicate packet filtering.

Figure 4A:
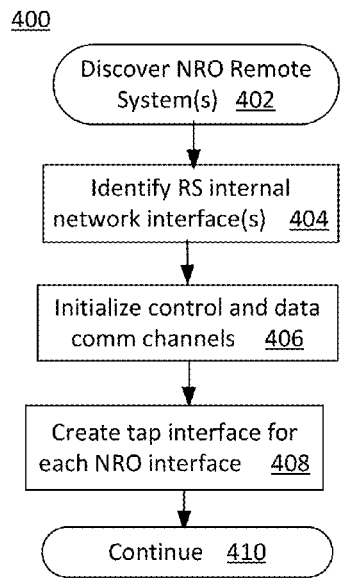
FIGS. 4A, 4B and 4C depict exemplary flow charts of initialization operations of an NRO master and/or NRO remote system, consistent with various embodiments of the present disclosure.
Figure 4B:
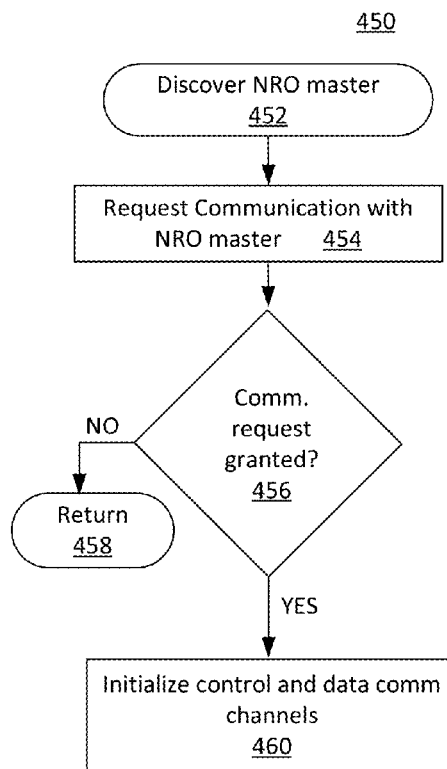
Figure 4C:
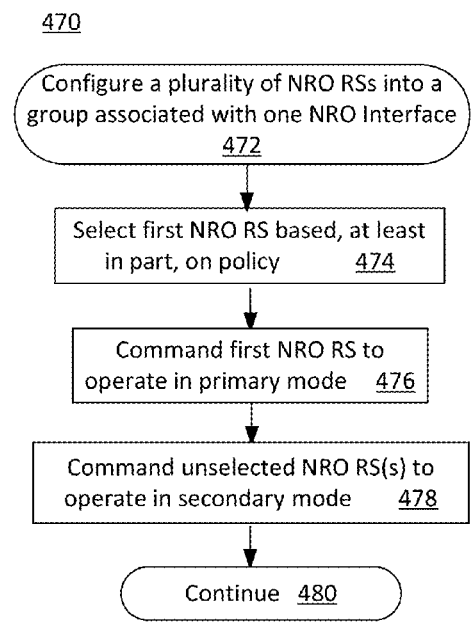

FIGS. 4A, 4B and 4C depict exemplary flow charts 400, 450, 470 of initialization operations of an NRO master and/or one or more NRO RS(s), consistent with various embodiments of the present disclosure. Turning to FIG. 4A, the operations of flow chart 400 may be performed, for example, by NRO master 120, 302. Operations of flow chart 400 may begin with operation 402. Operation 402 includes discovering NRO remote system(s) (RS(s)). RS internal network interface(s) may be identified at operation 404. Each RS internal interface may be related to a respective NRO interface. Operation 406 includes initializing control and data communication channels. The control and data communication channels may be connection-oriented and/or may be connectionless. A tap interface may be created for each NRO interface at operation 408. Program flow may continue at operation 410.

Turning to FIG. 4B, the operations of flow chart 450 may be performed, for example, by NRO RS(s) 122A, . . . , 122q, 304. Operations of flow chart 450 may begin with operation 452. Operation 452 includes discovering an NRO master. Communication with the NRO master may be requested at operation 454. Operation 456 includes determining whether the communication request has been granted. If the communication request has not been granted, program flow may return at operation 458. If the communication request has been granted, control and data communication channels may be initialized at operation 462. An external network interface address may be provided to the NRO master at operation 462. For example, the external network interface address may be exposed to an end system and may then correspond to an NRO interface address. For a group NRO RS configuration, e.g., group 124 of FIG. 1 the external network interface address may be provided to other members of the group. Program flow may continue at operation 464.

Turning to FIG. 4C, the operations of flow chart 470 may be performed, for example, by NRO master 120, 302. Operations of flow chart 470 may configure a plurality of NRO RS(s) into a group, as described herein. Operations of flow chart 470 may begin with operation 472. Operation 472 includes configuring a plurality of NRO RSs into a group associated with one NRO interface. For example, the ENI addresses of the plurality of NRO RSs in the group may be set to a same ENI address. Operation 474 may include selecting a first NRO RS of the group based, at least in part, on policy. The first NRO RS may be commanded to operate in primary mode at operation 476. Operation 478 may include commanding unselected NRO RS(s) of the group to operate in a secondary mode. The command may include a transmission indicator related to the secondary mode. The transmission indicator may be selected by the NRO master based, at least in part, on policy. For example, the transmission indicator may correspond to not transmitting, transmitting only NRO prefix(es) or transmitting full NRO message(s). A respective unselected NRO RS may then respond, according to the transmission indicator, for each received network frame. A respective transmission indicator may or may not be the same for each of the unselected NRO RS(s) in the group. Program flow may continue at operation 480.

Figure 5A:
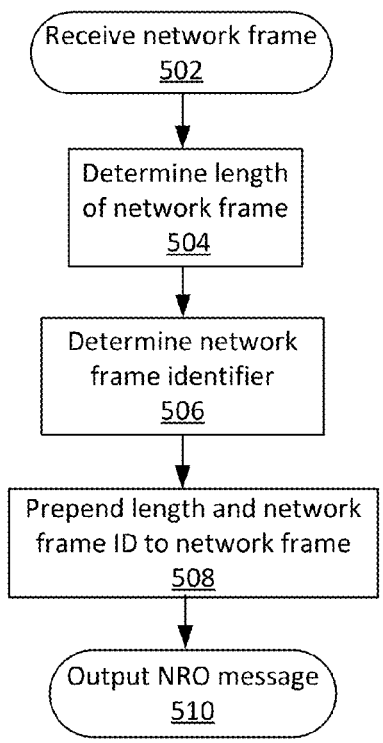
FIGS. 5A and 5B depict exemplary flow charts for generating an NRO message and extracting a network frame consistent with various embodiments of the present disclosure.
Figure 5B:
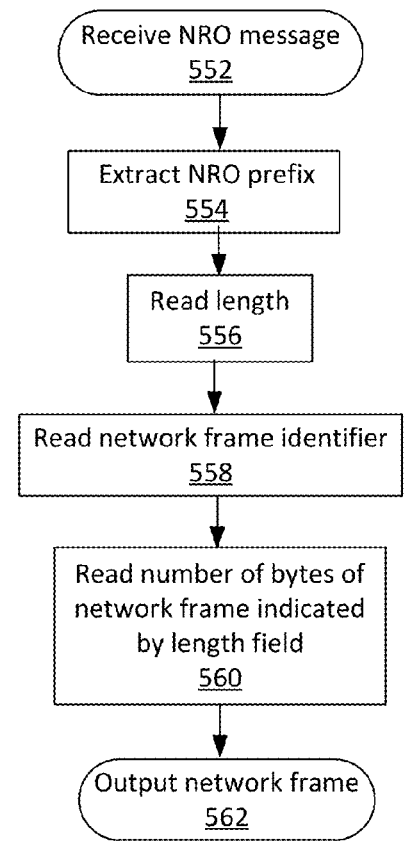

FIGS. 5A and 5B depict exemplary flow charts 500, 550 for generating an NRO message and extracting a network frame, respectively, consistent with various embodiments of the present disclosure. The operations of flow charts 500, 550 may be performed by, for example, NRO master 120, 302 and/or NRO RS 122A, . . . , 122q, 304. The operations of flow chart 500 are configured to generate an NRO message that contains a network frame. The operations of flow chart 550 are configured to identify and extract a network frame from an NRO message.

Turning to FIG. 5A, the operations of flow chart 500 may begin at operation 502, receiving a network frame. For example, the network frame may be received on an external network interface. Operation 504 includes determining a length of the network frame. Operation 506 includes determining a network frame identifier. For example, the network frame identifier may be a hash of the network frame. Operation 508 includes prepending the length and frame ID to the network frame to generate an NRO message. Operation 510 includes outputting the NRO message. For example, the NRO message may be written to a data channel. An OS may then encapsulate one or more NRO message(s) into an NRO frame and transmit the NRO frame out an appropriate network interface.

Turning to FIG. 5B, the operations of flow chart 550 may begin with receiving an NRO message at operation 552. For example, the NRO message may be received on a data channel from an internal network interface or a master network interface. An NRO prefix may be extracted at operation 554. The length may be read at operation 556. Operation 558 includes reading the network frame identifier. The network frame may then be identified. Operation 560 includes reading the number of bytes of the network frame indicated by the length. Operation 562 includes outputting the extracted network frame. For example, the extracted network frame may be written to a tap interface. In another example, the extracted network frame may be transmitted out an NRO interface.

Figure 6A:
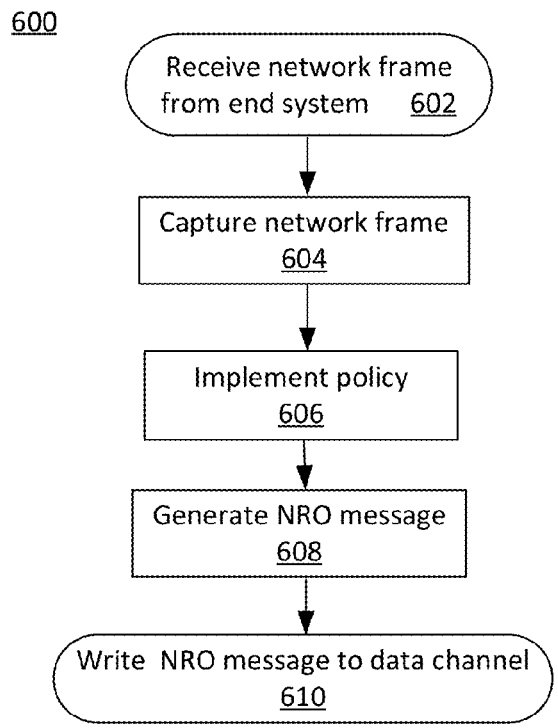
FIG. 6A depicts an exemplary flow chart of transmit and receive operations of an NRO remote system consistent with various embodiments of the present disclosure.

FIG. 6A depicts an exemplary flow chart 600 of transmit and receive operations of an NRO remote system consistent with various embodiments of the present disclosure. The operations of flow chart 600 may be performed by, e.g., NRO remote system 304. Operation 602 includes receiving a network frame from an end system. The network frame may be received on an NRO interface. The network frame may be captured at operation 604. For example, a raw network frame may be captured by an NRO RS module. A policy may be implemented at operations 606. For example, the policy may be provided by an NRO master. The policy may be configured to implement network traffic management functions configured to facilitate end system to end system network management. Operation 608 includes generating an NRO message. The NRO message may be written to a data channel at operation 610. The NRO message may then be encapsulated and transmitted by an OS. In some embodiments, operations 606 may follow operation 608. In some embodiments, at least some of operations 606 may precede operation 608 and at least some of operations 606 may follow operation 608.

Thus, the operations of flow chart 600 are configured to receive a network frame on an NRO interface, to generate an NRO message for each received network frame and to provide one or more NRO message(s) to an OS for encapsulation and transmission to an NRO master.

Figure 6C:
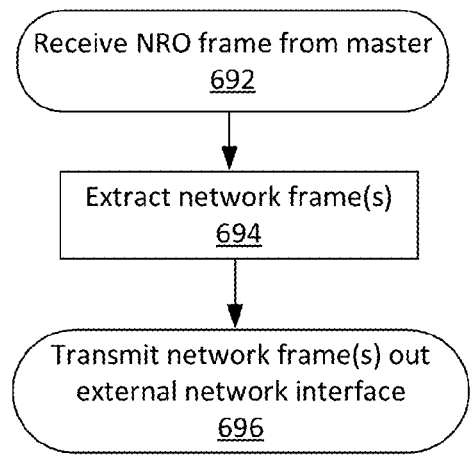
FIG. 6C depicts another exemplary flow chart of transmit and receive operations of an NRO remote system consistent with various embodiments of the present disclosure.
Figure 6B:
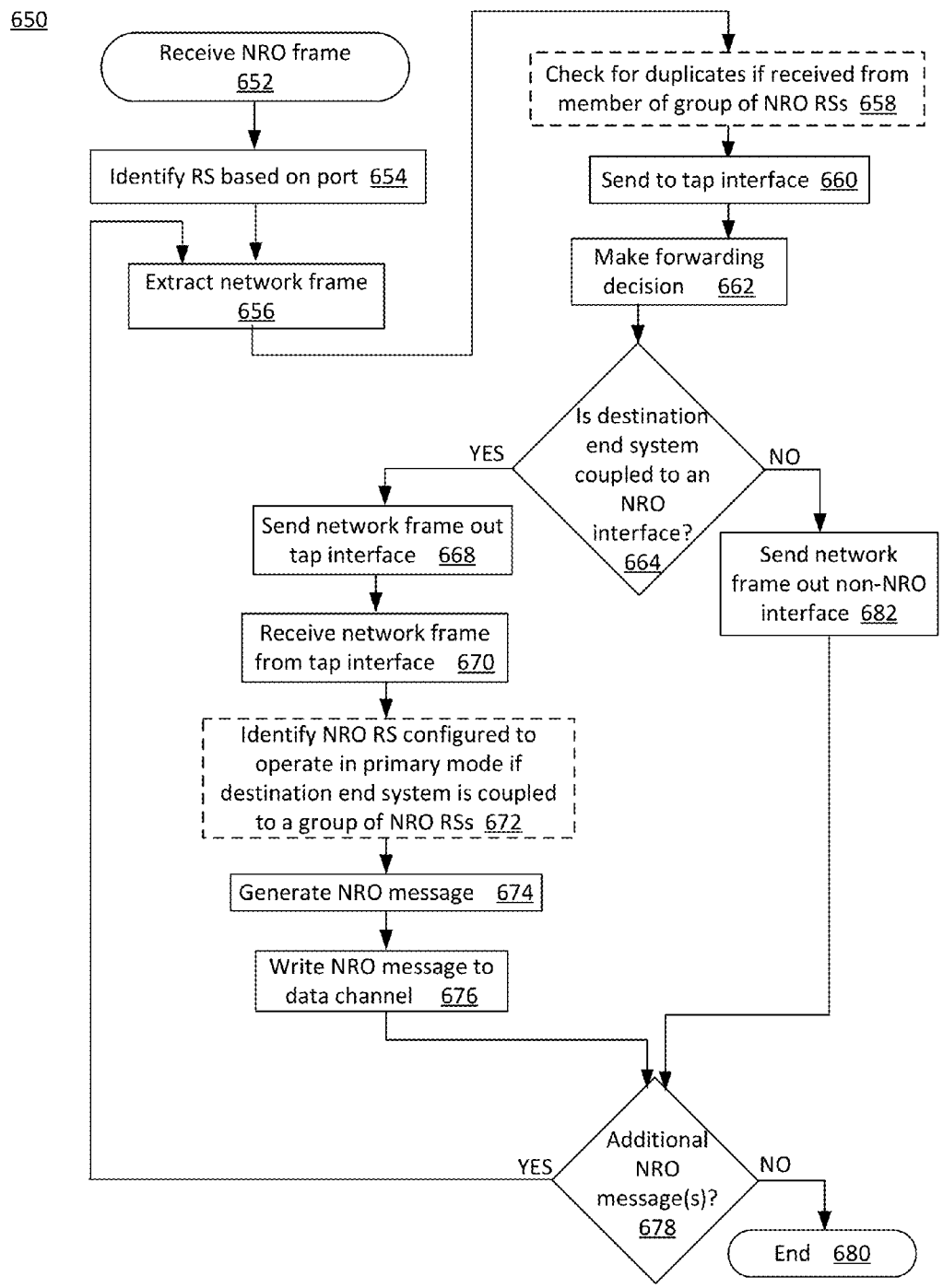
FIG. 6B depicts exemplary transmit and receive operations of an NRO master consistent with various embodiments of the present disclosure.

FIG. 6B depicts an exemplary flow chart 650 of transmit and receive operations of an NRO master consistent with various embodiments of the present disclosure. Operation 652 includes receiving an NRO frame. An RS may be identified based, at least in part on a port at operation 654. A network frame may be extracted at operation 656. In some embodiments, operation 658 may include a check for duplicate network frames, if the NRO message is received from a member of a group of NRO RSs. For example, operation 658 may include operations of flow chart 800 of FIG. 8A, as described in more detail below. Extracted network frames may be sent to a tap interface at operation 660. Operation 662 includes making a forwarding decision.

Whether a destination is an end system coupled to an NRO interface may be determined at operation 664. If the destination in an end system is coupled to an NRO interface, the network frame may be sent out a tap interface at operation 668. For example, the network frame may be sent out the tap interface by master OS 326. The network frame may be received from a tap interface at operation 670. In embodiments where the destination end system is coupled to a group of NRO RSs, an NRO RS configured to operate in primary mode of the group of NRO RSs may be identified at operation 672. For example, the NRO RS may have been commanded to operate in primary mode during configuration of the NRO RSs into the group. In another example, the NRO RS may have been commanded to operate in primary mode in response to operation of the group, e.g., according to one or more of the operations of flow chart 800 of FIG. 8A, described in more detail below. In embodiments where the destination end system is not coupled to a group of NRO RSs, operation 672 may not be included and program flow may proceed to operation 674 from operation 670. Operation 674 includes generating an NRO message. The NRO message may be written to a data channel at operation 676.

If the destination is an end system that is not coupled to an NRO interface (i.e., is a non-NRO communication partner coupled to a non-NRO interface), the network frame may be sent out a non-NRO interface at operation 682. Whether there are additional NRO message(s) in the NRO frame payload may be determined at operation 678. If there are additional NRO message(s), program flow may proceed to operation 656. If there are not additional NRO message(s), program flow may end at operation 680.

FIG. 6C depicts an exemplary flow chart 690 of transmit and receive operations of an NRO remote system consistent with various embodiments of the present disclosure. The operations of flow chart 690 may be performed by, e.g., NRO remote system 304. Operation 692 includes receiving an NRO frame from an NRO master. Network frame(s) may be extracted at operation 694. Network frame(s) may be transmitted out an external network interface at operation 696.

Figure 7A:
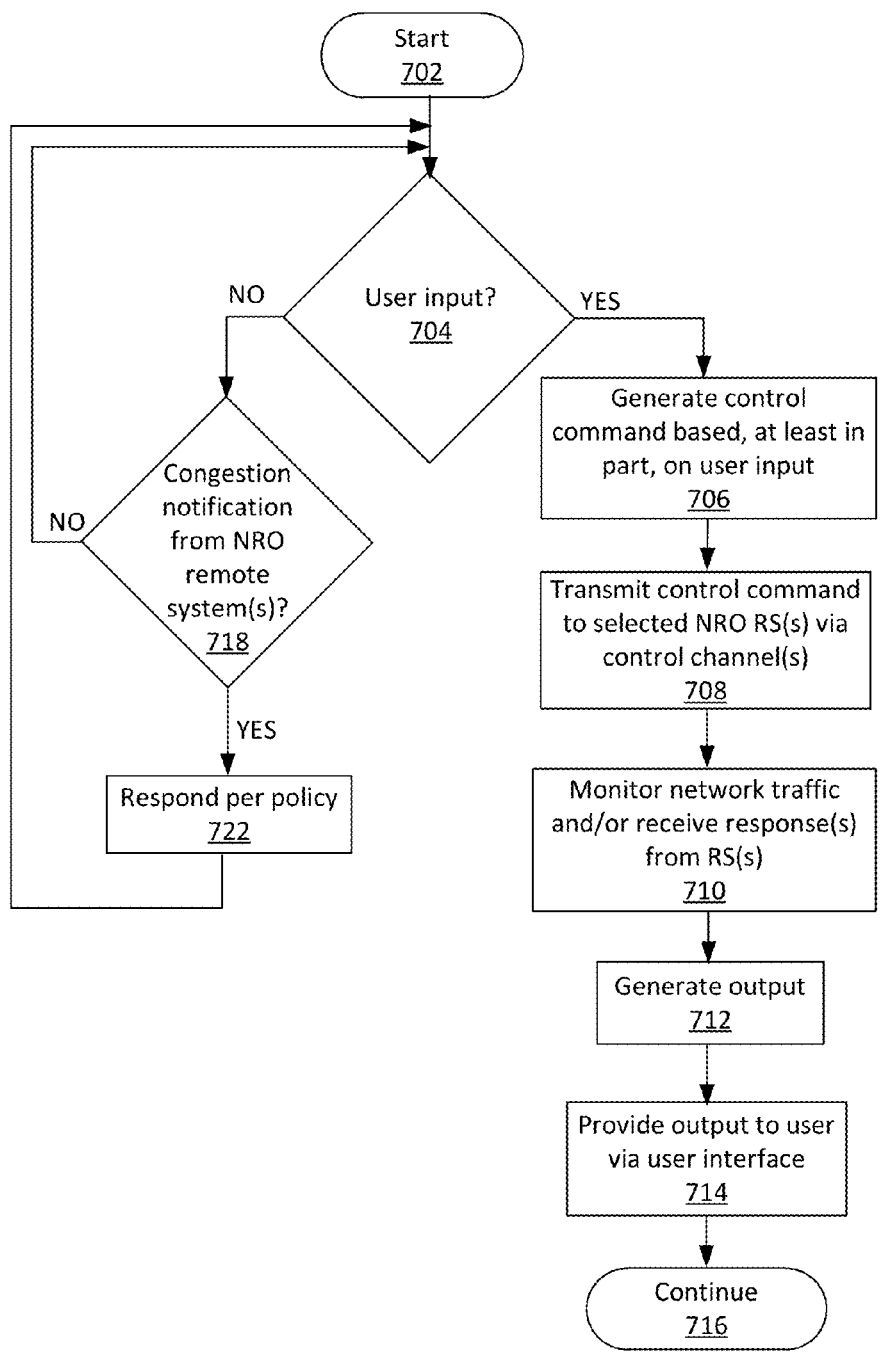
FIGS. 7A, 7B and 7C depict exemplary flow charts of control-related operations of an NRO master and/or NRO remote system, consistent with various embodiments of the present disclosure.
Figure 7B:
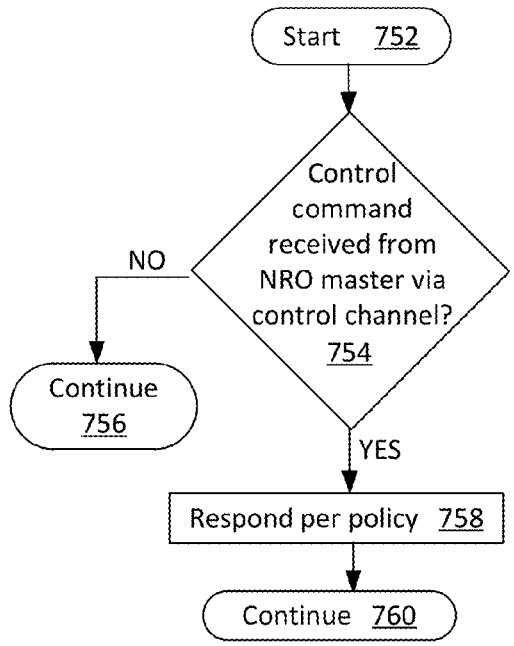
Figure 7C:
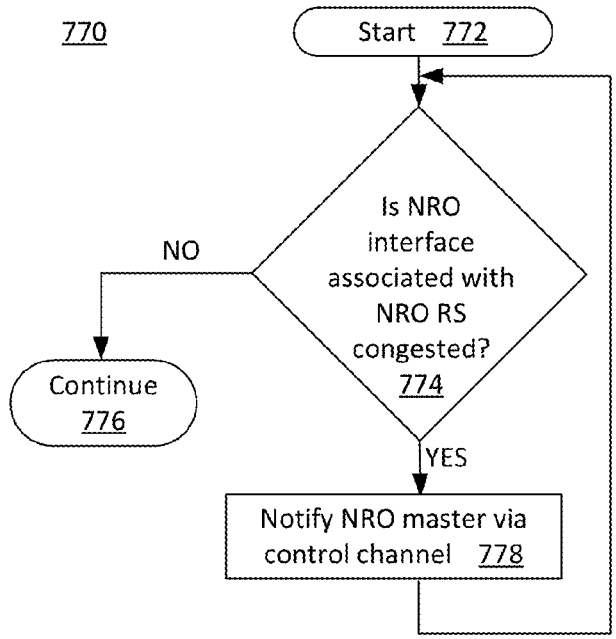

FIGS. 7A, 7B and 7C depict exemplary flow charts 700, 750, 770 of control-related operations of an NRO master and/or NRO RS, consistent with various embodiments of the present disclosure. The operations of flow charts 700, 750, 770 illustrate implementing network management operations, as described herein. Turning to FIG. 7A, the operations of flow chart 700 may be performed, for example, by NRO master 120, 302. Operations of flow chart 700 may begin with start at operation 702. Whether a user input has been received may be determined at operation 704. If a user input has been received, a control command may be generated based, at least in part, on user input at operation 706. Operation 708 includes transmitting the control command to selected NRO RS(s) via the control channel(s). Network traffic may be monitored and/or response(s) may be received from NRO RS(s) at operation 710. Operation 712 includes generating output. For example, the output may be generated based, at least in part, on monitoring traffic and/or response(s) received from NRO RS(s). Output may be provided to a user via the user interface at operation 714. Program flow may continue at operation 716.

If a user input has not been received, whether a congestion notification has been received from the NRO RS(s) may be determined at operation 718. If a congestion notification has not been received program flow may proceed to operation 704. If a congestion notification has been received, operation 722 may include responding per policy. Policy may include, e.g., commanding one or more NRO RSs to throttle, i.e., limit, transmission of network frames by delaying transmission and/or dropping network frames. Program flow may then proceed to operation 704.

Turning to FIG. 7B, the operations of flow chart 750 may be performed, for example, by NRO RS(s) 122A, . . . , 122q, 304. Operations of flow chart 750 may begin with operation 752, Start. Whether a control command has been received from the NRO master via a control channel may be determined at operation 754. If a control command has not been received from the NRO master via the control channel, program flow may continue at operation 756. If a control command has been received from the NRO master via the control channel, operation 758 may include responding per policy. Program flow may then continue at operation 760.

Turning to FIG. 7C, the operations of flow chart 770 may be performed, for example, by NRO RS(s) 122A, . . . , 122q, 304. Operations of flow chart 770 may begin with operation 772, Start. Whether an NRO interface associated with an NRO RS is congested may be determined at operation 774. For example, whether the NRO interface is congested may be determined based, at least in part, on a fill level of Tx/Rx queues included in the NRO RS associated with the NRO interface. If the NRO interface is not congested, program flow may continue at operation 776. If the NRO interface is congested, the NRO master may be notified via the control channel at operation 778. Program flow may then proceed to operation 772.

Figure 8A:
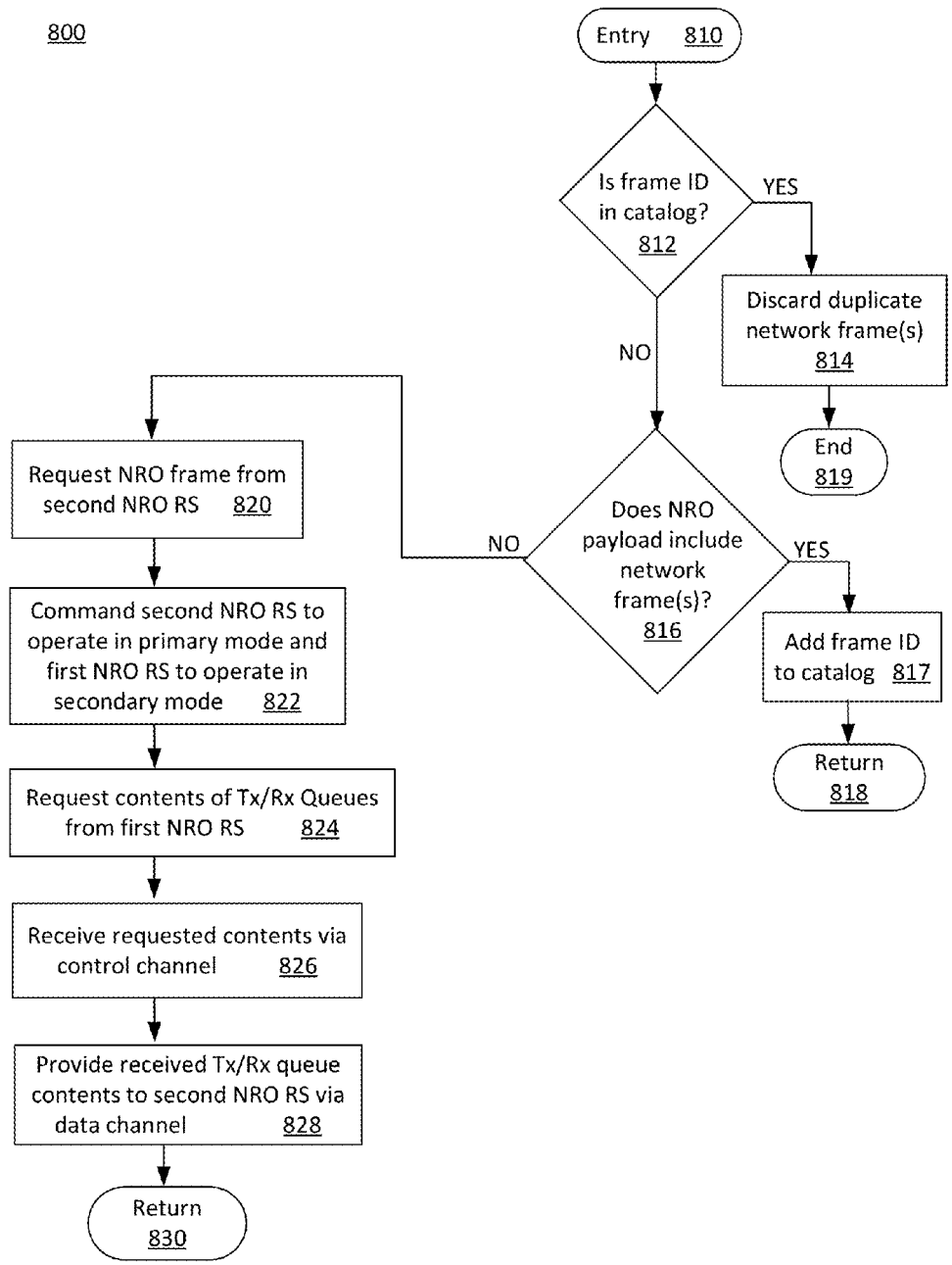
FIGS. 8A and 8B depict exemplary flow charts of operations of an NRO master and/or an NRO remote system, configured for a plurality of NRO remote systems (group) coupled to a single NRO interface, consistent with one embodiment of the present disclosure.
Figure 8B:
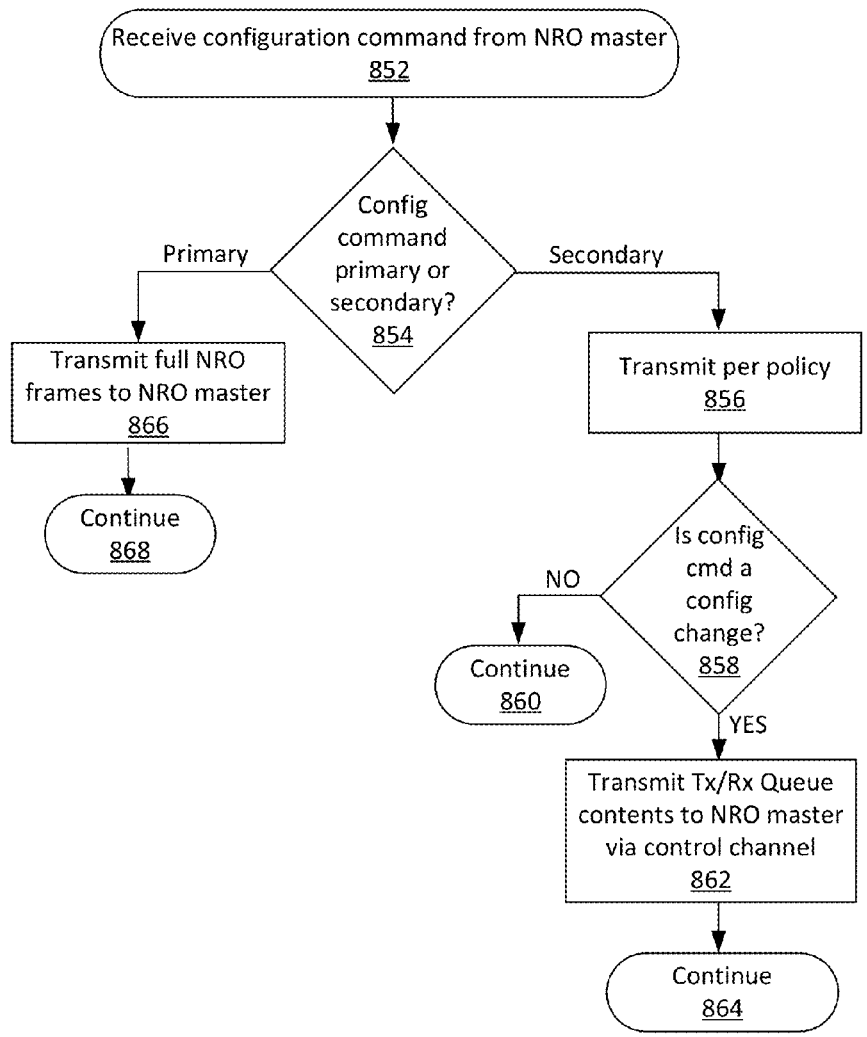

FIGS. 8A and 8B depict exemplary flow charts 800, 850 of operations of an NRO master and NRO remote system (RS), respectively, configured for a plurality of NRO RSs (i.e., group) coupled to a single NRO interface, consistent with one embodiment of the present disclosure. Turning to FIG. 8A, the operations of flow chart 800 may be performed, for example, by NRO master 120, 302. The operations of flow chart 800 are configured to detect duplicate NRO message(s) and to determine when to select a different NRO RS to operate in primary mode, as described herein. For example, operations of flow chart 800 may be included in operation 658 of FIG. 6.

Operations of flow chart 800 may begin with operation 810, entry. Whether a received frame ID is in a received frame ID catalog may be determined at operation 812. For example, NRO frame(s) received from a first RS configured to operate in primary mode (selected RS), unselected RS(s) configured to transmit only NRO prefix(es) and/or unselected RS(s) configured to transmit full NRO message(s) may include one or more frame IDs. If a received frame ID is in the received frame ID catalog, the associated duplicate network frame(s) may be discarded at operation 814. Program flow may then end at operation 819. If a received frame ID is not in the received frame ID catalog, whether the NRO payload from an unselected second RS includes network frame(s) may be determined at operation 816. If the NRO payload from the second RS includes network frame(s), the frame ID(s) may be added to the frame ID catalog at operation 817. Program flow may return at operation 818.

If the NRO payload from the second NRO RS does not include network frame(s), the NRO frame may be requested from the second NRO RS at operation 820. The second NRO RS may be commanded to operate in primary mode and the first NRO RS may be commanded to operate in secondary mode at operation 822. Operation 824 may include requesting the contents of the Tx/Rx Queues from the first NRO RS. The requested contents may be received via the control channel at operation 826. The received Tx/Rx queue contents may be provided to the second NRO RS via the data channel at operation 828. Program flow may then return at operation 830.

Turning to FIG. 8B, the operations of flow chart 850 may be performed, for example, by NRO RSs 122B, . . . , 122k, 304. Operations of flow chart 850 are configured to command NRO RS(s) to operate in primary or secondary mode. Operations of flow chart 850 may begin with operation 852. Operation 852 includes receiving a configuration command from the NRO master, e.g., NRO master 120, 302. Whether the configuration command corresponds to operation in a primary mode or secondary mode may be determined at operation 854. If the configuration command corresponds to the secondary mode then NRO frames may or may not be transmitted to the NRO master according to policy at operation 856. For example, policy may indicate to not transmit, to transmit only NRO prefix(es) or to transmit full NRO message(s). Whether the configuration command is a configuration change may be determined at operation 858. If the configuration command is not a configuration change, program flow may then continue at operation 860. If the configuration command is a configuration change, operation 862 may include transmitting Tx/Rx Queue contents to NRO master via a control channel. Program flow may continue at operation 864. If the configuration command corresponds to operation in a primary mode, full NRO frames may be transmitted to the NRO master at operation 866. Program flow may continue at operation 868.

Figure 9A:
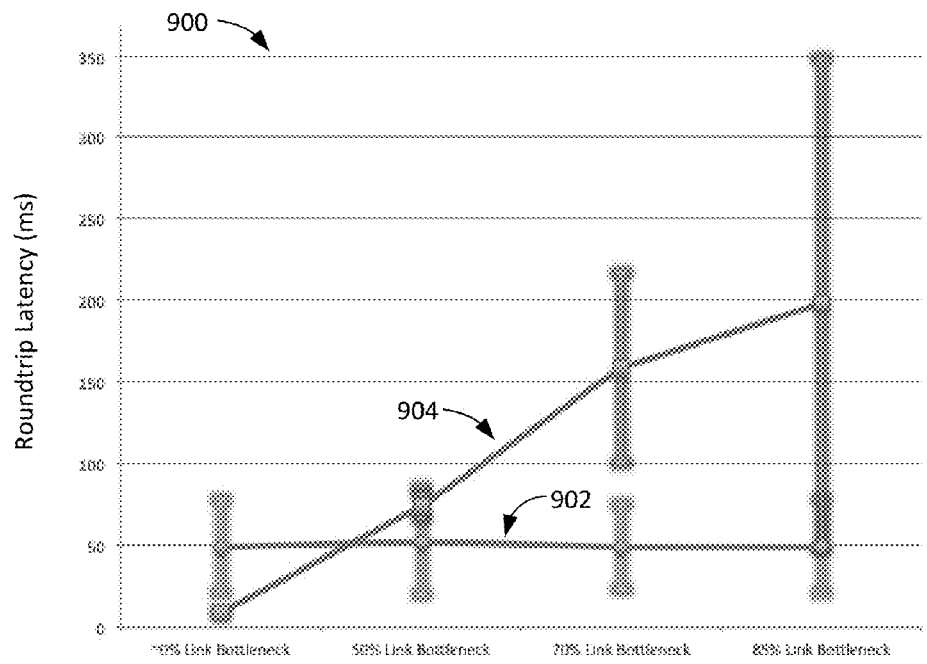
FIG. 9A is a plot of roundtrip latency for different congestion levels for an NRO system with a relatively local NRO master and NRO remote systems consistent with one embodiment of the present disclosure.
Figure 9B:
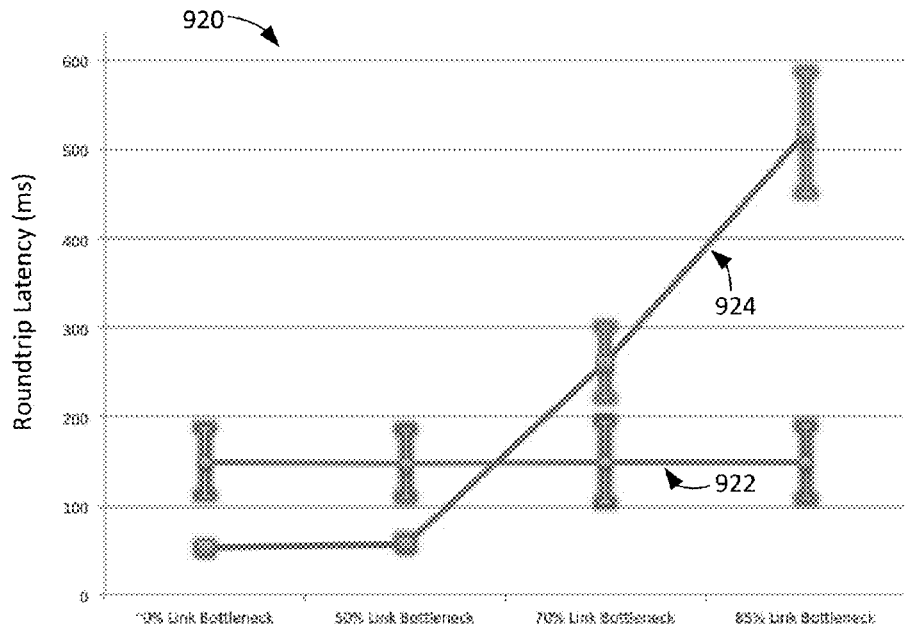
FIG. 9B is a plot of roundtrip latency for different congestion levels for an NRO system with a relatively distant NRO master and NRO remote system consistent with one embodiment of the present disclosure.

FIG. 9A is a plot 900 of roundtrip latency for different congestion levels for relatively local end systems consistent with one embodiment of the present disclosure. FIG. 9B is a plot 920 of roundtrip latency for different congestion levels for relatively distant end systems consistent with one embodiment of the present disclosure. Configurations of NRO master and NRO RSs were the same for both plots 900 and 920. Turning to FIG. 1, the NRO system 102 included an NRO master and two NRO RSs, e.g., NRO RS 122A, 122B. Each NRO RS was coupled to a respective end system, e.g. first end system 104A and second end system 104B. The configuration did not include a group of NRO RSs, i.e., did not include group 124. Each end system 104A, 104B included two user device(s), e.g., laptop computers, coupled by a network switch (i.e., network device 110 and network device 114, respectively). NRO system 102 was configured as a router and OS 326 was Linux. Turning to FIG. 3, the NRO master and first NRO RS were included in one device. In other words, NRO master included both NRO master module 332 and NRO RS module 362. The first end system 104A, the NRO master 120 and first NRO RS 122A were located at one physical location and the second end system 104B and second NRO RS 122B were located at a second physical location. For plot 900, NRO master 120, the first NRO RS 122A and first end system 104A were separated from the second NRO RS 122B and second end system 104B by a distance of less than ten miles, i.e., on the order of ones of miles. For plot 920, the separation was approximately 1800 miles, i.e., on the order of thousands of miles.

Generally, the experimental procedure included transmitting Internet Control Message Protocol (ICMP) echo requests (i.e., "ping" messages) from a first user device, e.g., user device 112A included in the first end system 104A, to a first user device, e.g., user device 116A included in the second end system 104B, and an echo response from the first user device 116A in the second end system 104B to the first user device 112A in the first end system in response to the echo request. The first user device 112A in the first end system was configured to measure round-trip travel time of request and response. The ping messages included DiffServ markings of "Expedited Forwarding". Congestion was simulated by a second user device, e.g., user device 116p, in the second end system transmitting a flood ping with 1450-byte ICMP payloads to a second user device, e.g., user device 112n, in the first system. The 1450-byte ICMP payloads did not include DiffServ markings and thus, may have been classified as "best effort".

Four tests were conducted for each configuration with each test run simulating a level of network traffic, i.e., a level of congestion. Each test was repeated one thousand times. Baseline data was gathered for each end system 104A, 104B coupled to the underlying network by a conventional router and NRO data was gathered for each end system coupled to the network by a respective NRO RS, e.g., 122A, 122B. The bit rate between the switch and router was constrained to 10 Mbps (megabits per second) to aid reaching a congested state. The tests included increasing levels of simultaneous ping probes: 0 ("0% link bottleneck"), 5 ("50% link bottleneck"), 25 ("70% link bottleneck") and 50 ("85% link bottleneck").

Turning to plot 900, curve 902 is a plot of experimental data (roundtrip latency in milliseconds (ms)) for the configuration that included an NRO system consistent with the present disclosure and curve 904 corresponds experimental data for the configuration with a conventional router. Turning to plot 920, curve 922 is a plot of experimental data for the configuration that included an NRO system consistent with the present disclosure and curve 924 corresponds to the configuration with a conventional router. It may be appreciated that the configurations that included an NRO system consistent with the present disclosure experienced little or no increase in roundtrip latency as congestion was increased.

Accordingly, an NRO system and/or method, consistent with the present disclosure is configured to provide a network routing overlay (NRO) coupled between a plurality of end systems. The NRO is configured to overlay an underlying network that provides actual connectivity between the plurality of end systems and is configured to appear to end system(s) as a single network device, e.g., a single network hop. Each of the plurality of end systems may be coupled to the NRO system at a respective NRO interface. The NRO system may then be configured to implement one or more network traffic management functions and/or policies.

NRO master 120, 302, RS(s) 122A, ..., 122q, 304 and/or end systems 104A, ..., 104m may communicate using a switched fabric communications protocol. One example communications protocol may include an Ethernet communications protocol which may be capable of permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard for Ethernet", published in December, 2008, revised August 2012 and/or later versions of this standard. Alternatively or additionally, NRO master 120, 302, RS(s) 122A, ..., 122q, 304 and/or end system(s) 104A, ..., 104m may be capable of communicating using an wireless communications protocol. The wireless communication protocol may comply or be compatible with the wireless LAN standard (IEEE Std 802.11) published by the IEEE titled "IEEE Standard for Information Technology—Telecommunications and information exchange between systems, Local and metropolitan area networks—Specific requirements, Part 11: Wireless LAN Medium Access Control (MAC) and Physical Layer (PHY) Specifications", published in 2007, revised February 2012 and/or later versions of this standard. Alternatively or additionally, NRO master 120, 302, RS(s) 122A, ..., 122q, 304 and/or end system(s) 104A, ..., 104m may be capable of communicating using an X.25 communications protocol. The X.25 communications protocol may comply or be compatible with a standard promulgated by the International Telecommunication Union-Telecommunication Standardization Sector (ITU-T). Alternatively or additionally, NRO master 120, 302, RS(s) 122A, ..., 122q, 304 and/or end system(s) 104A, ..., 104m may be capable of communicating using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally NRO master 120, 302, RS(s) 122A, . . . , 122q, 304 and/or end system(s) 104A, . . . , 104m may be capable of communicating using an Asynchronous Transfer Mode (ATM) communications protocol. The ATM communications protocol may comply or be compatible with an ATM standard published by the ATM Forum titled "ATM-MPLS Network Interworking 2.0" published August 2001, and/or later versions of this standard. Of course, different and/or after-developed connection-oriented network communication protocols are equally contemplated herein.

Alternatively or additionally, NRO master 120, 302, RS(s) 122A, . . . , 122q, 304 and/or end system(s) 104A, . . . , 104m may be capable of communicating using a cryptographic protocol. For example, the cryptographic protocol may comply or be compatible with the Request for Comments (RFC) 5246 published by the Internet Engineering Task Force (IETF) titled "The Transport Layer Security (TLS) Protocol Version 1.2", published in August 2008 and/or later versions of this standard. In another example, the cryptographic protocol may comply or be compatible with the historic Request for Comments (RFC) 6101 published by the IETF titled "The Secure Sockets Layer (SSL) Protocol Version 3.0", published in August 2011.

The operating system (e.g., OS 326, 356) may be configured to manage system resources and control tasks that are run on, e.g., NRO master 302 and/or NRO RS(s), e.g., NRO RS 304. For example, the OS may be implemented using Microsoft® Windows®, HP-UX®, Linux®, UNIX®, Android™, iOS® or Windows Phone®, although other operating systems may be used. The OS machine may implement one or more protocol stacks, e.g., protocol stacks 328, 358. A protocol stack may execute one or more programs to process packets. An example of a protocol stack is a TCP/IP (Transport Control Protocol/Internet Protocol) protocol stack comprising one or more programs for handling (e.g., processing or generating) packets to transmit and/or receive over a network.

Memory 324, 354 may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory may comprise other and/or later-developed types of computer-readable memory.

Embodiments of the operations described herein may be implemented in a system that includes one or more storage devices having stored thereon, individually or in combination, instructions that when executed by one or more processors perform the methods. The processor may include one or more processing unit(s) and/or programmable circuitry. Thus, it is intended that operations according to the methods described herein may be distributed across a plurality of physical devices, such as processing structures at several different physical locations. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. "Module", as used herein, may comprise, singly or in any combination circuitry and/or code and/or instructions sets (e.g., software, firmware, etc.).

Although illustrative embodiments and methods have been shown and described, a wide range of modifications, changes, and substitutions is contemplated in the foregoing disclosure and in some instances some features of the embodiments or steps of the method may be employed without a corresponding use of other features or steps. Accordingly, it is appropriate that the claims be construed broadly and in a manner consistent with the scope of the embodiments disclosed herein.

What is claimed is:

1. A network routing overlay (NRO) system comprising:
   an NRO master comprising NRO master circuitry and a master network interface, the master network interface configured to communicatively couple to each of a plurality of NRO remote systems via a respective Ethernet data channel and a respective Ethernet control channel, and wherein the NRO master circuitry is configured to:
   receive a NRO message comprising an NRO prefix and an Ethernet frame from a first NRO remote system of the plurality of NRO remote systems via the respective Ethernet data channel, the NRO prefix comprising a length and a frame identifier (ID) and the Ethernet frame including an identifier of a destination end system coupled to at least one of the plurality of NRO remote systems and an identifier of a source end system coupled to the first NRO remote system,
   extract the Ethernet frame based, at least in part, on the length and frame ID; and
   implement one or more network traffic management policies by sending each of the plurality of NRO remote systems one or more commands to prioritize transmission of NRO messages having encapsulated Ethernet frames to the NRO master.

2. The NRO system of claim 1, wherein the NRO message comprises at least a first priority marking provided by the first NRO remote system and a second priority marking provided by the source end system.

3. The NRO system of claim 1, wherein the NRO master circuitry is further configured to maintain a plurality of connection-oriented data channels with each of the plurality of NRO remote systems, and wherein the one or more commands to prioritize transmission of NRO messages sent to each of the plurality of NRO remote systems is further configured to cause each of the plurality of NRO remote systems to at least one of:
   drop and/or delay low-priority Ethernet frames received from an end device based on an associated priority marking provided by the end device;
   adjust a priority marking within each NRO message encapsulating an Ethernet frame from an end device based on a value provided by the NRO master; and
   send each NRO message encapsulated with an Ethernet frame from an end device via a connection-oriented data channel of the plurality of connection-oriented data channels that corresponds with a priority marking within each NRO message.

4. The NRO system of claim 1, wherein the NRO master circuitry is further configured to cause the first NRO remote system to operate in a primary mode and to cause at least a second NRO remote system of the plurality of NRO remote systems to operate in a secondary mode, and wherein the first and second NRO remotes systems are communicatively coupled to and receive identical Ethernet frames from one or more end devices.

5. The NRO system of claim 4, wherein the primary mode is configured to cause the first NRO remote system to send NRO messages having encapsulated Ethernet frames, and wherein the secondary mode is configured to cause the second NRO remote system to send NRO messages without encapsulated Ethernet frames to reduce network congestion.

6. The NRO system of claim 1, wherein the NRO system is configured to operate as at least one of an Ethernet router, an Ethernet switch, an Ethernet bridge and/or an Ethernet hub.

7. The NRO system of claim 1, wherein a first communication protocol associated with the Ethernet frame is different from a second communication protocol associated with the NRO message.

8. The NRO system of claim 1, wherein the NRO master circuitry is configured to implement the one or more network traffic management policies based, at least in part, on a respective congestion notification from one or more of the plurality of NRO remote systems.

9. A method comprising:
establishing, by network routing overlay (NRO) master circuitry, a respective Ethernet data channel and a respective Ethernet control channel between a NRO master network interface coupled to the NRO master circuitry and each NRO remote system of a plurality of NRO remote systems;
receiving, by the NRO master circuitry, a NRO message comprising an NRO prefix and an Ethernet frame from a first NRO remote system of the plurality of NRO remote systems via the respective Ethernet data channel, the NRO prefix comprising a length and a frame identifier (ID) and the Ethernet frame including an identifier of a destination end system coupled to at least one of the plurality of NRO remote systems and an identifier of a source end system coupled to the first NRO remote system;
extracting, by the NRO master circuitry, the Ethernet frame based, at least in part, on the length and frame ID; and
implementing, by the NRO master circuitry, one or more network traffic management policies by sending each of the plurality of NRO remote systems one or more commands to prioritize transmission of NRO messages having encapsulated Ethernet frames to the NRO master, the one or more commands being configured to cause each of the plurality of NRO remote systems to delay and/or drop low-priority Ethernet frames received from end devices.

10. The method of claim 9, wherein the NRO message comprises at least a first priority marking provided by the first NRO remote system and a second priority marking provided by the source end system.

11. The method of claim 9, further comprising maintaining, by the NRO master circuitry, a plurality of connection-oriented data channels with each of the plurality of NRO remote systems, and wherein sending each of the plurality of NRO remote systems one or more commands to prioritize transmission of NRO messages is further configured to cause each of the plurality of NRO remote systems to at least one of:
drop and/or delay low-priority Ethernet frames received from an end device based on an associated priority marking provided by the end device;
adjust a priority marking within each NRO message encapsulating an Ethernet frame from an end device based on a value provided by the NRO master; and
send each NRO message encapsulated with an Ethernet frame from an end device via a connection-oriented data channel of the plurality of connection-oriented data channels that corresponds with a priority marking within each NRO message.

12. The method of claim 9, further comprising:
configuring, by the NRO master circuitry, the first NRO remote system to operate in a primary mode; and
configuring, by the NRO master circuitry, at least a second NRO remote system of the plurality of NRO remote systems to operate in a secondary mode,
wherein the first NRO remote system and at least the second NRO remote system are communicatively coupled to and receive identical Ethernet frames from one or more end devices.

13. The method of claim 12, wherein the primary mode is configured to cause the first NRO remote system to send NRO messages having encapsulated Ethernet frames, and wherein the secondary mode is configured to cause at least the second NRO remote system to send NRO messages without encapsulated Ethernet frames to reduce network congestion.

14. The method of claim 9, wherein the NRO system is configured to operate as at least one of an Ethernet router, an Ethernet switch, an Ethernet bridge and/or an Ethernet hub.

15. The method of claim 9, wherein a first communication protocol associated with the Ethernet frame is different from a second communication protocol associated with the NRO message.

16. The method of claim 9, wherein implementing, by the NRO master circuitry, the one or more network traffic management policies is further based, at least in part, on a respective congestion notification from one or more of the plurality of NRO remote systems.

17. A non-transitory computer-readable medium having a plurality of instructions encoded thereon that when executed by at least one processor cause a network routing overlay (NRO) process to be carried out, the NRO process comprising:
establishing a respective Ethernet data channel and a respective Ethernet control channel with each NRO remote system of a plurality of NRO remote systems;
receiving an NRO message comprising an NRO prefix and an Ethernet frame from a first NRO remote system of the plurality of NRO remote systems via the respective Ethernet data channel, the NRO prefix comprising a length and a frame identifier (ID) and the Ethernet frame including an identifier of a destination end system coupled to at least one of the plurality of NRO remote systems and an identifier of a source end system coupled to the first NRO remote system;
extracting the Ethernet frame based, at least in part, on the length and frame ID; and
identifying an NRO remote system of the plurality of NRO remote systems associated with the destination end system identified by the Ethernet frame;
generating a second NRO message including the Ethernet frame encapsulated therein;

adjusting a priority marking within the second NRO message based on one or more network traffic management policies;

sending the second NRO message to the identified NRO remote system, the second NRO message configured to cause the identified NRO remote system to send at least the network frame to the destination end system in a protocol supported by the destination end system; and implementing the one or more network traffic management policies by sending each of the plurality of NRO remote systems one or more commands to prioritize transmission of NRO messages having encapsulated Ethernet frames.

18. The computer-readable medium of claim 17, wherein the NRO message comprises at least a first priority marking provided by the first NRO remote system and a second priority marking provided by the source end system.

19. The computer-readable medium of claim 17, wherein the NRO process further comprises maintaining a plurality of connection-oriented data channels with each of the plurality of NRO remote systems, and wherein implementing the one or more network traffic management policies by sending each of the plurality of NRO remote systems one or more commands to prioritize transmission of NRO messages is further configured to cause each of the plurality of NRO remote systems to at least one of:

drop and/or delay low-priority Ethernet frames received from an end device based on an associated priority marking provided by the end device;

adjust a priority marking within each NRO message encapsulating an Ethernet frame from an end device based on a value associated with the one or more traffic management policies; and send each NRO message encapsulated with an Ethernet frame from an end device via a connection-oriented data channel of the plurality of connection-oriented data channels that corresponds with a priority marking within each NRO message.

20. The computer-readable medium of claim 17, wherein the NRO process further comprises:

configuring the first NRO remote system to operate in a primary mode; and configuring at least a second NRO remote system of the plurality of NRO remote systems to operate in a secondary mode, wherein the first NRO remote system and at least the second NRO remote system are communicatively coupled to and receive identical Ethernet frames from one or more associated end devices.

21. The computer-readable medium of claim 20, wherein the primary mode is configured to cause the first NRO remote system to send NRO messages having encapsulated Ethernet frames, and wherein the secondary mode is configured to cause at least the second NRO remote system to send NRO messages without encapsulated Ethernet frames to reduce network congestion.

22. The computer-readable medium of claim 17, wherein the NRO system is configured to operate as at least one of an Ethernet router, an Ethernet switch, an Ethernet bridge and/or an Ethernet hub.

23. The computer-readable medium of claim 17, wherein a first communication protocol associated with the Ethernet frame is different from a second communication protocol associated with the NRO message.

24. The computer-readable medium of claim 17, wherein implementing the one or more network traffic management policies is based, at least in part, on a respective congestion notification from one or more of the plurality of NRO remote systems.

* * * * *